United States Patent
Kosaka

(10) Patent No.: US 12,345,572 B2
(45) Date of Patent: Jul. 1, 2025

(54) BOLOMETER AND METHOD FOR MANUFACTURING SAME

(71) Applicant: NEC Corporation, Tokyo (JP)

(72) Inventor: Mayumi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 18/201,551

(22) Filed: May 24, 2023

(65) Prior Publication Data

US 2023/0384163 A1 Nov. 30, 2023

(30) Foreign Application Priority Data

May 27, 2022 (JP) .................. 2022-086637

(51) Int. Cl.
- G01J 5/08 (2022.01)
- G01J 5/02 (2022.01)
- G01J 5/04 (2006.01)

(52) U.S. Cl.
CPC ............. *G01J 5/0853* (2013.01); *G01J 5/023* (2013.01); *G01J 5/046* (2013.01)

(58) Field of Classification Search
CPC .......... G01J 5/0853; G01J 5/023; G01J 5/046; G01J 5/024; G01J 5/20
See application file for complete search history.

(56) References Cited

U.S. PATENT DOCUMENTS

2011/0203632 A1 8/2011 Sen et al.

FOREIGN PATENT DOCUMENTS

| JP | 2015-049207 A | 3/2015 |
| WO | 2012/049801 A1 | 4/2012 |
| WO | 2020/158455 A1 | 8/2020 |

OTHER PUBLICATIONS

U.S. Office Action for U.S. Appl. No. 18/201,540, mailed on Mar. 20, 2025.

*Primary Examiner* — David P Porta
*Assistant Examiner* — Gisselle M Gutierrez
(74) *Attorney, Agent, or Firm* — Sughrue Mion, PLLC

(57) ABSTRACT

One object of the present invention is to provide a bolometer with improved TCR. The present invention relates to a bolometer including two electrodes provided on a substrate and a bolometer film lying between the two electrodes to connect the two electrodes, wherein the bolometer film includes p-type semiconducting carbon nanotubes, and contact sites of the two electrodes with the bolometer film each consist only of a monometal or alloy having higher work function than the p-type semiconducting carbon nanotubes, or the proportion of a monometal or alloy having lower work function than the p-type semiconducting carbon nanotubes in metals constituting the contact sites of the two electrodes with the bolometer film is 10% by mass or less, or the contact area of a monometal or alloy having lower work function than the p-type semiconducting carbon nanotubes with the bolometer film is 10% or less of the total contact area between the electrodes and the bolometer film.

9 Claims, 14 Drawing Sheets (a)

(b)

(c)

(d)

(e)

(f)

(g)

(h)

(i)

(j)

(k)

(l)

(m)

(n)

(o)

(p)

(q)

(r)

(s)

(a)

(b)

BOLOMETER AND METHOD FOR MANUFACTURING SAME

This application is based upon and claims the benefit of priority from Japanese patent application No. 2022-086637, filed on May 27, 2022, the disclosure of which is incorporated herein in its entirety by reference.

TECHNICAL FIELD

The present invention relates to a bolometer and a method for manufacturing the same, specifically a bolometer using carbon nanotubes and a method for manufacturing the same.

BACKGROUND ART

Infrared sensors have a very wide range of applications such as not only monitoring cameras for security, but also thermography for human body, in-vehicle cameras, and inspection of structures, foods, and the like, and are thus actively used in industrial applications in recent years. In particular, development of a low-cost and high-performance uncooled infrared sensor capable of obtaining biological information in cooperation with IoT (Internet of Things) is expected. In the known uncooled infrared sensors, VOx (vanadium oxide) has been mainly used in the bolometer unit, but since a heat treatment under vacuum is required, there had been the problems of high process cost and low temperature coefficient resistance (TCR) thereof (about −2.0%/K).

Since a material having large resistance change against temperature change and high conductivity is required to improve TCR, semiconducting single-walled carbon nanotubes having a large band gap and carrier mobility are expected to be applied to the bolometer unit. Since carbon nanotubes are chemically stable, an inexpensive device manufacturing processes such as printing technology can be applied, and thus, there is a possibility that a low-cost and high-performance infrared sensor can be made.

For example, Patent Document 1 suggests applying typical single-walled carbon nanotubes to a bolometer unit, and producing a bolometer by a low-cost thin film process in which a dispersion liquid is prepared by mixing single-walled carbon nanotubes in an organic solvent utilizing their chemical stability and then is applied on an electrode. In this case, TCR is successfully improved to about −1.8%/K by subjecting single-walled carbon nanotubes to annealing treatment in the air.

Single-walled carbon nanotubes typically comprise carbon nanotubes of a semiconducting character and carbon nanotubes of a metallic character at 2:1, and hence separation of them is disadvantageously needed. To address this disadvantage that single-walled carbon nanotubes comprise metallic and semiconducting components mixing together, Patent Document 2 discloses application of chirally consistent semiconducting single-walled carbon nanotubes extracted with an ionic surfactant to bolometer parts, and a TCR of −2.6%/K has been successfully achieved. Patent Document 2 discloses configuring separate electrodes with metals having different work functions, and, as an example thereof, configuring the first electrode with gold and the second electrode with titanium.

CITATION LIST

Patent Literature

Patent Document 1: WO 2012/049801
Patent Document 2: Japanese Patent Laid-Open No. 2015-49207

SUMMARY OF INVENTION

Technical Problem

In the structure of electrodes disclosed in Patent Document 2, Schottky junctions are formed between an electrode and a carbon nanotube film. If such electrodes are used for a bolometer, the element exhibits Schottky-type IV characteristics (FIG. 8). The formation of Schottky junctions is not problematic for thin-film transistors and the like; however, Schottky junctions are disadvantageous for bolometers in that higher currents tend to flow at lower temperature at positive high voltages, for example, under the influence of the temperature characteristics of the Schottky barrier and the mobility of carbon nanotubes, whereas semiconductors exhibit higher resistance at lower temperature, and the temperature-dependent resistance variation is cancelled in a positive high-voltage region, resulting in low TCR (FIG. 9).

Accordingly, an object of the present invention is to provide a bolometer with improved TCR.

Solution to Problem

The present invention solves the above problems by configuring the electrodes so that an ohmic contact is formed between the carbon nanotube film and the electrodes.

One aspect of the present invention relates to:
a bolometer comprising two electrodes provided on a substrate and a bolometer film lying between the two electrodes to connect the two electrodes, wherein
the bolometer film comprises p-type semiconducting carbon nanotubes, and
contact sites of the two electrodes with the bolometer film each consist only of a monometal or alloy having higher work function than the p-type semiconducting carbon nanotubes, or
the proportion of a monometal or alloy having lower work function than the p-type semiconducting carbon nanotubes in metals constituting the contact sites of the two electrodes with the bolometer film is 10% by mass or less, or the contact area of a monometal or alloy having lower work function than the p-type semiconducting carbon nanotubes with the bolometer film is 10% or less of the total contact area between the electrodes and the bolometer film.

One aspect of the present invention relates to:
a bolometer comprising two electrodes and a bolometer film lying between the two electrodes to connect the two electrodes, wherein
the bolometer film comprises n-type semiconducting carbon nanotubes, and
contact sites of the two electrodes with the bolometer film each consist only of a monometal or alloy having lower work function than the n-type semiconducting carbon nanotubes, or
the proportion of a monometal or alloy having higher work function than the n-type semiconducting carbon nanotubes in metals constituting the contact sites is 10% by mass or less, or the contact area of a monometal or alloy having higher work function than the n-type semiconducting carbon nanotubes with the bolometer film is 10% or less of the total contact area between the electrodes and the bolometer film.

One aspect of the present invention relates to:

a method for producing a bolometer comprising two electrodes and a bolometer film lying between the two electrodes to connect the two electrodes, the method comprising:

forming two electrodes on a substrate; and producing a bolometer film comprising p-type semiconducting carbon nanotubes in such a manner that the bolometer film connects the two electrodes, wherein contact sites of the two electrodes with the bolometer film each consist only of a monometal or alloy having higher work function than the p-type semiconducting carbon nanotubes, or the proportion of a monometal or alloy having lower work function than the p-type semiconducting carbon nanotubes in metals constituting the contact sites of the two electrodes with the bolometer film is 10% by mass or less, or the contact area of a monometal or alloy having lower work function than the p-type semiconducting carbon nanotubes with the bolometer film is 10% or less of the total contact area between the electrodes and the bolometer film.

One aspect of the present invention relates to:

a method for producing a bolometer comprising two electrodes and a bolometer film lying between the two electrodes to connect the two electrodes, the method comprising:

converting carbon nanotubes each into an n-type semiconductor;

forming two electrodes; and producing a bolometer film comprising n-type semiconducting carbon nanotubes in such a manner that the bolometer film connects the two electrodes, wherein contact sites of the two electrodes with the bolometer film each consist only of a monometal or alloy having lower work function than the n-type semiconducting carbon nanotubes, or the proportion of a monometal or alloy having higher work function than the n-type semiconducting carbon nanotubes in metals constituting the contact sites of the two electrodes with the bolometer film is 10% by mass or less, or the contact area of a monometal or alloy having higher work function than the n-type semiconducting carbon nanotubes with the bolometer film is 10% or less of the total contact area between the electrodes and the bolometer film.

Advantageous Effect of Invention

According to the present invention, a bolometer with improved TCR can be provided.

DESCRIPTION OF EMBODIMENTS

Figure 10:
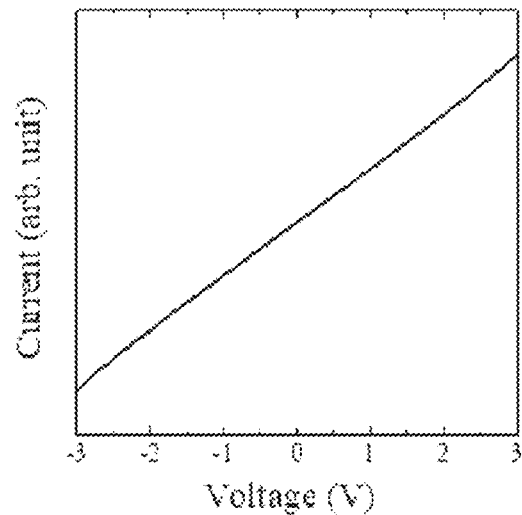
FIG. 10 is a graph showing IV characteristics for an example in Examples.
Figure 11:
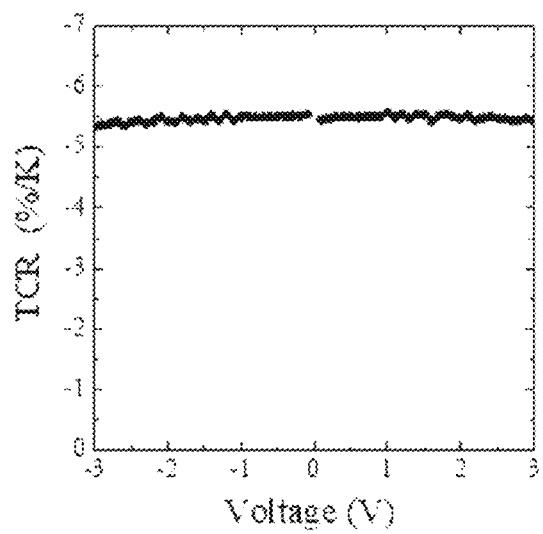
FIG. 11 is a graph showing TCR for an example in Examples.
Figure 12:
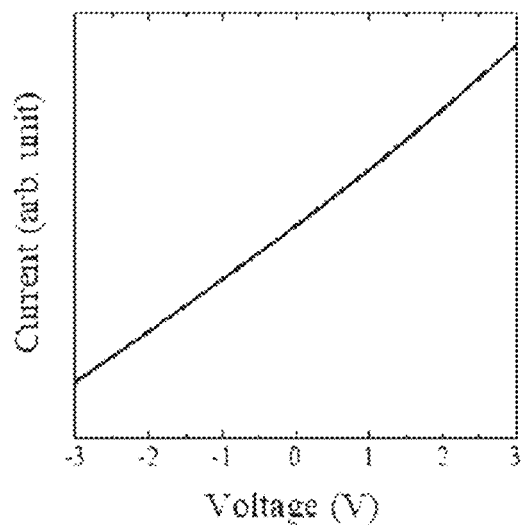
FIG. 12 is a graph showing IV characteristics for an example in Examples.
Figure 13:
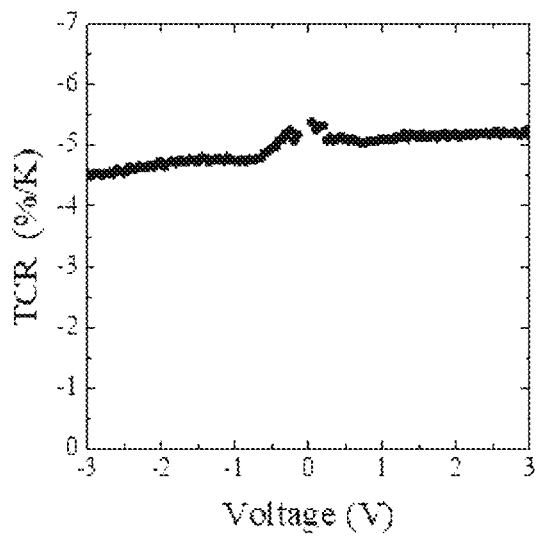
FIG. 13 is a graph showing TCR for an example in Examples.

For a bolometer comprising two electrodes and a bolometer film comprising carbon nanotubes connecting these electrodes, the present inventors have found that the configuration in which the two electrodes are provided on a bolometer film with p-type semiconducting carbon nanotubes in such a manner that only a monometal or alloy having higher work function than the carbon nanotubes is in contact with the bolometer film allows the formation of ohmic junctions between the bolometer film and an electrode, resulting in linear IV characteristics as IV characteristics in use as an element (FIG. 10, FIG. 12), and that elements having such ohmic IV characteristics exhibit high TCR in a broad voltage region including positive voltages and high voltages (FIG. 11, FIG. 13).

While carbon nanotubes are each a p-type semiconductor in their natural states, they can be each transformed into an n-type semiconductor as described later. Similarly, the configuration in which the two electrodes are provided on a bolometer film with n-type semiconducting carbon nanotubes in such a manner that only a monometal or alloy having lower work function than the carbon nanotubes is in contact with the bolometer film allows the formation of ohmic junctions between the bolometer film and an electrode, leading to successful achievement of high TCR in a broad voltage region as with the case with p-type semiconducting carbon nanotubes.

Figure 14:
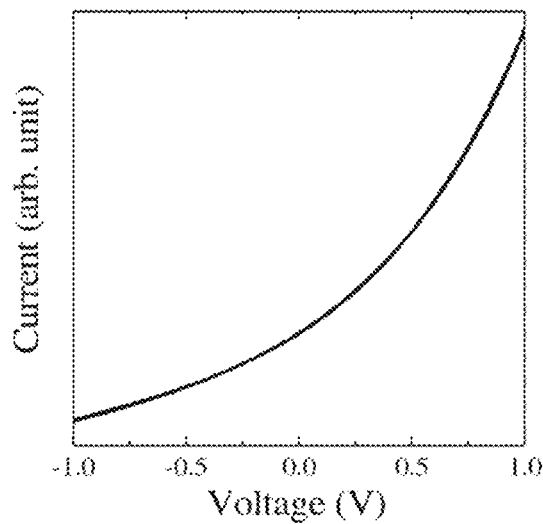
FIG. 14 is a graph showing IV characteristics for an example in Examples.
Figure 15:
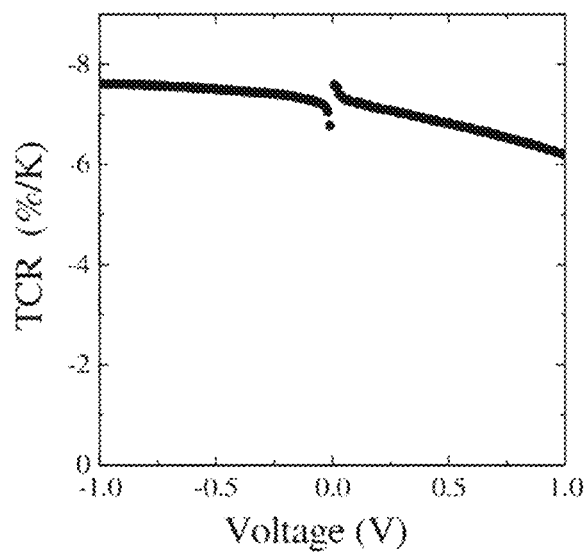
FIG. 15 is a graph showing TCR for an example in Examples.
Figure 16:
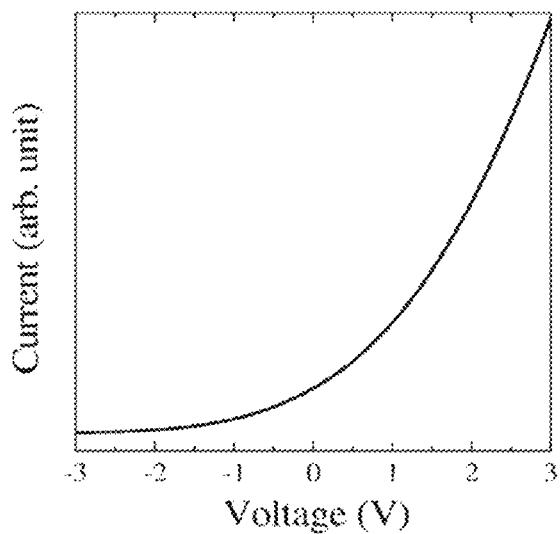
FIG. 16 is a graph showing IV characteristics for an example in Examples.
Figure 17:
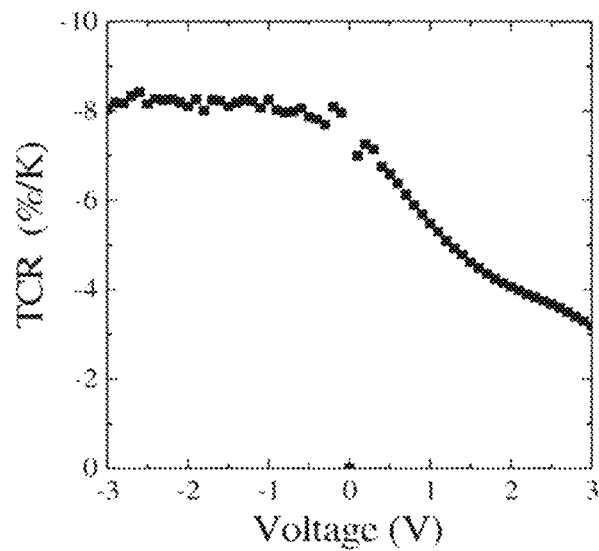
FIG. 17 is a graph showing TCR for an example in Examples.

For the case of using a bolometer film with p-type semiconducting carbon nanotubes and a monometal or alloy having lower work function than the carbon nanotubes therefor, the present inventors have found that in the case that the proportion of the lower-work-function monometal or alloy used is low, specifically, in the case that the proportion of the monometal or alloy having lower work function than the carbon nanotubes in metals constituting contact sites of the electrodes with the bolometer film is 10% by mass or less, or that the contact area between the monometal or alloy having lower work function than the carbon nanotubes and the bolometer film is 10% or less of the total contact area between the electrode and the bolometer film, a Schottky-type IV component overlaps with an ohmic linear IV component (FIG. 14, FIG. 16) and particularly high TCR is exhibited in a broad voltage region (FIG. 15, FIG. 17).

Likewise, in the case of using n-type semiconducting carbon nanotubes, use of a monometal or alloy having higher work function than the n-type semiconducting carbon nanotubes in a low proportion gives particularly high TCR in a broad voltage region, similarly.

[Structure of Bolometer]

Figure 1:
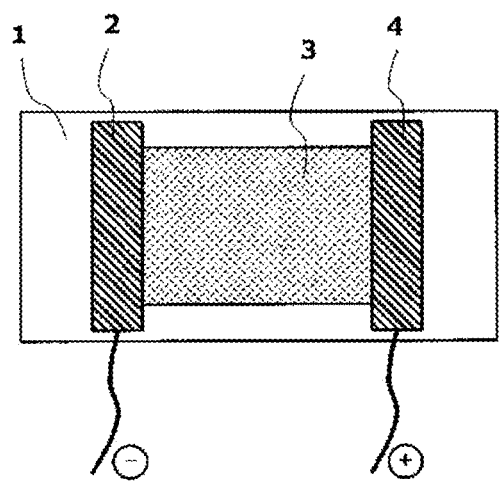
FIG. 1 is a schematic diagram (top view) showing the structure of a bolometer according to one embodiment of the present invention.

FIG. 1 is a schematic diagram illustrating an example of a bolometer of the present embodiment. The bolometer of the present embodiment includes: a first electrode 2 and a second electrode 4 on a substrate 1; and a bolometer film 3 containing carbon nanotubes, wherein the bolometer film 3 connects the first electrode 2 and the second electrode 4.

Herein, a bolometer film with p-type semiconducting carbon nanotubes is a bolometer film such that semiconducting carbon nanotubes in the bolometer film are composed mainly of p-type semiconducting carbon nanotubes. The proportion of the p-type semiconducting carbon nanotubes in the semiconducting carbon nanotubes of the bolometer film is preferably 95% by mass or more, more preferably 98% by mass or more, and particularly preferably 100% by mass.

However, if some of the p-type semiconducting carbon nanotubes are replaced with n-type semiconducting carbon nanotubes for the purpose of obtaining IV characteristics such that a Schottky-type IV component is overlapping with an ohmic linear IV component as described later in Embodiment 3, a numerical value lower than the aforementioned numerical range may be employed as the proportion of the p-type semiconducting carbon nanotubes.

A bolometer film with n-type semiconducting carbon nanotubes is a bolometer film such that semiconducting carbon nanotubes of the bolometer film are composed mainly of n-type semiconducting carbon nanotubes. The proportion of the n-type semiconducting carbon nanotubes in the semiconducting carbon nanotubes of the bolometer film is preferably 95% by mass or more, and more preferably 98% by mass or more (including 100% by mass). However, if some of the n-type semiconducting carbon nanotubes are replaced with p-type semiconducting carbon nanotubes for the purpose of obtaining IV characteristics such that a Schottky-type IV component is overlapping with an ohmic linear IV component as described later in Embodiment 3, a numerical value lower than the aforementioned numerical range may be employed as the proportion of the n-type semiconducting carbon nanotubes.

Herein, a bolometer film with p-type or n-type semiconducting carbon nanotubes is occasionally referred to as a "carbon nanotube film" or a "carbon nanotube layer".

(Electrodes)

Metals to be used for electrodes in the bolometer and the structure of the electrodes of the present embodiment will be described.

The following describes electrodes comprising a monometal or alloy with the work function being higher than those of carbon nanotubes (4.6 to 4.8 eV) for use for a bolometer film with p-type semiconducting carbon nanotubes, as an example; if a bolometer film with n-type semiconducting carbon nanotubes is used, the phrase "a monometal or alloy having higher work function" is read as "a monometal or alloy having lower work function", and the phrase "a monometal or alloy having lower work function" is read as "a monometal or alloy having higher work function". Metals that may be combined to form the electrodes for p-type semiconducting carbon nanotubes and those for n-type semiconducting carbon nanotubes are different. Accordingly, use of an n-type semiconducting carbon nanotube film in place of the p-type semiconducting carbon nanotubes gives more choices of metals, and may allow selection of metals suitable for physical properties required for the electrodes.

A monometal or alloy having higher work function than carbon nanotubes is occasionally referred to as "a higher-work-function monometal or alloy", simply. The term "metal" is occasionally used as a collective term for monometals and alloys. If two or more metals are used for an electrode in the following description, any of a combination of monometals, a combination of a monometal(s) and an alloy(s), and a combination of alloys may be used as long as the combination has required work function.

Metal Constituting Electrodes

Examples of monometals having higher work function than the p-type semiconducting carbon nanotubes that are used for sites of the electrodes of the present embodiment to be in contact with the p-type semiconducting carbon nanotube film include gold, platinum, copper, cobalt, nickel, carbon, and palladium.

Alternatively, an alloy may be used for sites to be in contact with the p-type semiconducting carbon nanotube film, and in this case the work function of the alloy is needed to be higher than those of the p-type semiconducting carbon nanotubes. Examples of such alloys include an alloy of two or more metals selected from the aforementioned metals having higher work function than the p-type semiconducting carbon nanotubes, and an alloy comprising any of those metals together with a certain amount of another metal.

Examples of monometals having lower work function than the n-type semiconducting carbon nanotubes that are used for the electrodes to be connected to the n-type semiconducting carbon nanotube film include titanium, iron, aluminum, silver, tungsten, zinc, chromium, tin, lead, magnesium, manganese, yttrium, niobium, vanadium, zirconium, molybdenum, indium, lanthanum, tantalum, hafnium, bismuth, ruthenium, and rhodium.

Alternatively, an alloy may be used for the electrodes to be connected to the n-type semiconducting carbon nanotube film, and in this case the work function of the alloy is needed to be lower than those of the n-type semiconducting carbon nanotubes. Examples of such alloys include an alloy of two or more metals selected from the aforementioned metals having lower work function than the n-type semiconducting carbon nanotubes, and an alloy comprising any of those metals together with a certain amount of another metal.

Structure of Electrodes

Embodiment 1: An Embodiment with the Configuration in which Two Electrodes and a Bolometer Film with p-Type Semiconducting Carbon Nanotubes are Provided in Such a Manner that Only a Monometal or Alloy Having Higher Work Function than the Carbon Nanotubes is in Contact with the Bolometer Film The bolometer of the present embodiment includes: two electrodes; and a carbon nanotube film provided to be in contact with the two electrodes, and both the two electrodes are configured in such a manner that sites to be in contact with the carbon nanotube film consist only of a monometal or alloy having higher work function than the carbon nanotubes.

The structure of the electrodes may be any structure, without limitation, such that the carbon nanotube film is in contact only with a metal having higher work function than the carbon nanotubes among metals constituting the electrodes.

1-1. Configuring Both the Electrodes Only with a Metal Having Higher Work Function than the Carbon Nanotubes.

In an embodiment, both the electrodes can be configured only with a metal having higher work function than the carbon nanotubes.

Figure 2A:
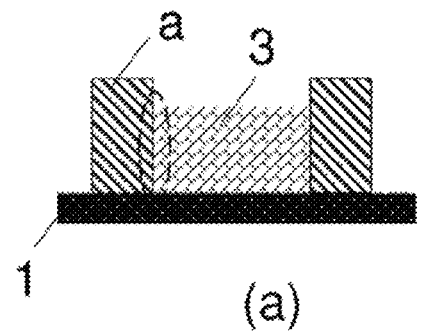
FIGS. 2A to 2D are schematic views (vertical cross-sectional views) illustrating examples of the structure of electrodes in the bolometer of the present invention.
Figure 2B:
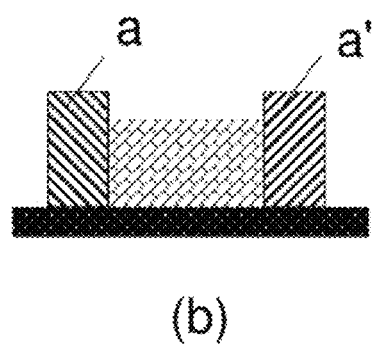
Figure 2C:
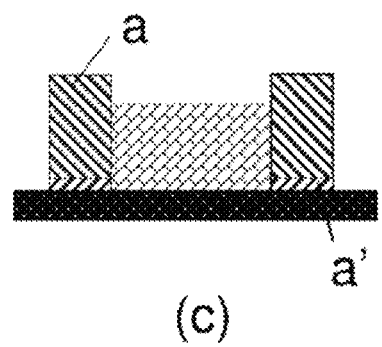
Figure 2D:
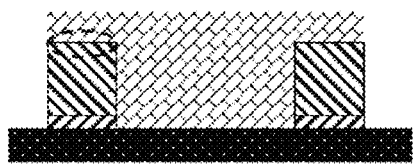

In this case, the same metal may be used for the two electrodes (FIG. 2A), and the two electrodes may be formed with different metals having higher work function than the carbon nanotubes (FIG. 2B). Each electrode may be configured with only one higher-work-function metal, or configured with a combination of two or more parts each consisting of a metal having higher work function than the carbon nanotubes (FIGS. 2C, 2D).

In an embodiment, it is preferable that a part with a metal highly adhesive to the substrate (e.g., a' in FIG. 2C) be provided at each site to be in contact with the substrate. Examples of metals being highly adhesive to the substrate and having higher work function than the carbon nanotubes include Cu and an alloy of any of the aforementioned higher-work-function metals and a lower-work-function metal highly adhesive to the substrate, such as Ti and Cr, provided that the work function of the alloy is higher than those of the carbon nanotubes.

In the present embodiment, the carbon nanotube film may be in contact with the side walls of the two electrodes (i.e., the electrode walls in contact with carbon nanotubes) (the dashed circle in FIG. 2A), or in contact with the top surfaces of the two electrodes in addition to the side walls (the dashed circle in FIG. 2D), or in contact only with the top surfaces of the two electrodes (not shown).

1-2. Configuring at Least One of the Electrodes with a Metal Having Higher Work Function than the Carbon Nanotubes and a Metal Having Lower Work Function than the Carbon Nanotubes.

In an embodiment, a configuration may be employed in which sites of the electrodes in contact with carbon nanotubes are composed of a metal having higher work function than the carbon nanotubes and at least some of parts not in contact with carbon nanotubes are composed of a metal having lower work function than the carbon nanotubes.

(1-2-1)

In an embodiment, a part consisting of a metal having higher work function than the carbon nanotubes can be provided between a part consisting of a metal having lower work function than the carbon nanotubes and the carbon nanotube film.

Figure 3E:
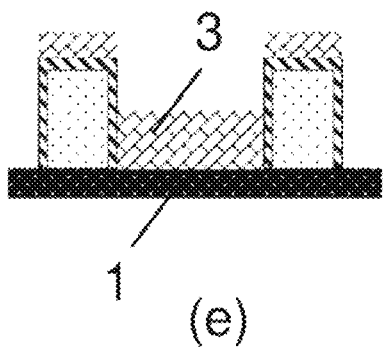
FIGS. 3E to 3I are schematic views (vertical cross-sectional views) illustrating examples of the structure of electrodes in the bolometer of the present invention.
Figure 3F:
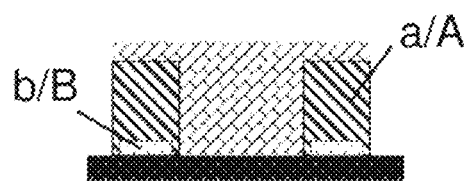
Figure 3G:
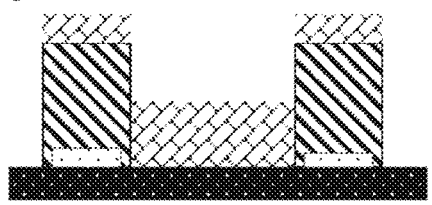
Figure 3H:
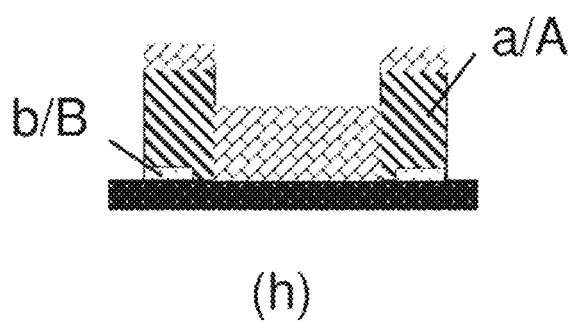
Figure 3I:
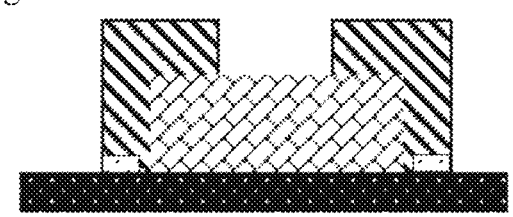

For example, a part of an electrode is configured with a metal having lower work function than the carbon nanotubes, and a part of the lower-work-function metal part in contact with carbon nanotubes is covered with a metal having higher work function than the carbon nanotubes. The covering with a higher-work-function metal may be applied only to a part in contact with carbon nanotubes, or to the whole of an electrode wall (side wall) in contact with carbon nanotubes (FIGS. 3H, 3I), and the whole of a part of a lower-work-function metal may be covered with a higher-work-function metal (FIGS. 3E, 3F, 3G).

The thickness of the covering with a higher-work-function metal needs to be a thickness enough to allow the formation of ohmic junctions between carbon nanotubes and the higher-work-function metal, and is, for example, 100 nm or larger, and preferably 1 µm or larger.

Any method for producing such electrodes may be used without limitation, and an example thereof will be described with reference to FIG. 3F. First, parts B each consisting of a lower-work-function metal b are formed on a substrate. Next, electrode patterning is performed with a mask or the like to produce electrodes slightly wider than the parts B (e.g., 100 nm or larger), and parts A are formed through vapor deposition with a metal a having higher work function than carbon nanotubes. Finally, the mask is removed. As a result, electrodes in which the parts B each consisting of the lower-work-function metal b are covered with the parts A each consisting of the higher-work-function metal a are successfully formed. To form the mask, a material and method described later in Embodiment (1-2-4) may be appropriately used.

(1-2-2)

As another example in which a part of an electrode is configured with a metal having lower work function than the carbon nanotubes, a part consisting of a material to prevent the contact with carbon nanotubes may be provided at a part in which the lower-work-function metal and the carbon nanotube film are in contact to allow carbon nanotubes to be in contact only with the higher-work-function metal. This will be described with reference to FIGS. 4J to 4N. In the present embodiment, a metal b having lower work function than the carbon nanotubes is used as a first layer (a layer on a substrate) B of each of the two electrodes, and a higher-work-function metal a is used as a second layer A provided on the first layer and subsequent layers provided thereabove, and hence a structure in which each first layer B and carbon nanotubes 3 are not in contact is required for the formation of ohmic junctions. For this reason, a part 5 to prevent the contact with the carbon nanotube film in a thickness larger than those of the first layers of the electrodes is provided on the substrate between the electrodes, and the carbon nanotube layer 3 is provided on the part 5. This allows the carbon nanotube film 3 to be in contact only with the higher-work-function metal in the second layers A and subsequent layers.

Figure 4J:
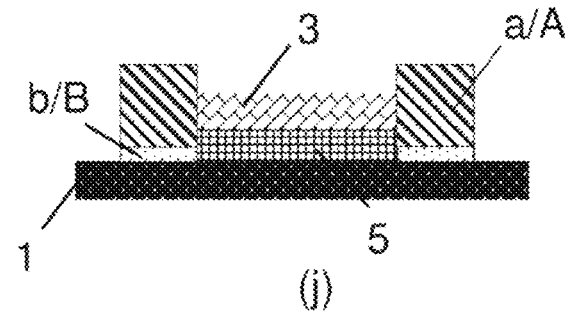
FIGS. 4J to 4N are schematic views (vertical cross-sectional views) illustrating examples of the structure of electrodes in the bolometer of the present invention.
Figure 4K:
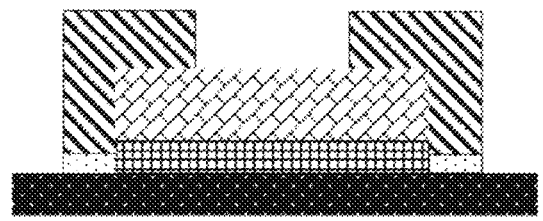
Figure 4L:
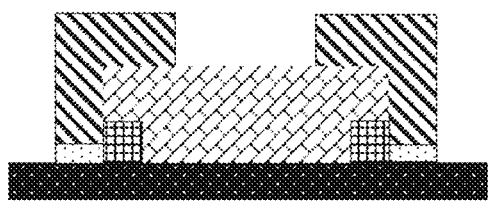

The part 5 to prevent the contact with the carbon nanotube film may be formed in the whole region between the electrodes (FIG. 4J, K), or only in parts in which the first layers B and carbon nanotubes are to be in contact (FIG. 4L).

Examples of the material of the part to prevent the contact with carbon nanotubes include, but are not limited to, a titanium dioxide layer, an insulating layer made of $SiO_2$, SiN, polyimide, or the like, and a layer of a conductive material having higher work function than the carbon nanotubes such as carbon, carbon nanohorns, and graphite.

A carbon nanotube film comprising substantially no surfactant may be used as a bolometer film for the bolometer of the present embodiment, as described later, whereas a carbon nanotube layer comprising a surfactant in a concentration higher than that of the mentioned bolometer film can also be used as an insulating layer of the part to prevent the contact with carbon nanotubes according to the present embodiment. The surfactant concentration of the carbon nanotube layer for use as an insulating layer is preferably 0.1% by mass or more based on the total mass of the bolometer film. Such a carbon nanotube layer having high surfactant concentration can be produced with the same procedure as for the bolometer film with adjustment of the surfactant concentration of a carbon nanotube dispersion described later.

(1-2-3)

Figure 4M:
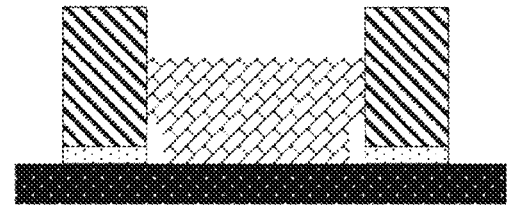

Other examples to prevent the contact with carbon nanotubes include a structure shown in FIG. 4M, in which the metal of the first layers B and carbon nanotubes are separated from each other without any contact site. Examples of methods for producing such a structure of electrodes include a method in which electrodes and a carbon nanotube layer 3 are formed on a substrate 1 and vibration or stress is applied to the carbon nanotube layer to weaken the contact between carbon nanotubes near the substrate, in other words, carbon nanotubes connecting to the first-layer electrodes, and the electrodes. Also in this case, the carbon nanotube layer 3 is allowed to be in contact only with the higher-work-function metal in the second layers A and subsequent layers.

(1-2-4)

As another example of the structure of electrodes in which two electrodes each consisting of a higher-work-function metal are provided on two electrodes provided on a substrate, carbon nanotubes may be allowed to be in contact only with the higher-work-function metal. For a structure of electrodes illustrated in FIG. 4N, for example, in which a lower-work-function metal b is used for at least parts of electrodes B (lower electrodes) provided on a substrate and a higher-work-function metal a is used for electrodes A (upper electrodes) connecting to the electrodes B, electrodes are produced in such a manner that the electrode walls of the lower electrodes B are not in contact with the carbon nanotube film 3 to allow the carbon nanotube film to be in contact only with the upper electrodes A.

An example of methods for producing such a structure of electrodes will be described with reference to FIG. 7A. In the present embodiment, electrodes 6 to be connected to measuring devices or detectors (lower electrodes, hereinafter also referred to as "detection electrodes") such as electrode pads are produced, regions each including electrode pad parts 6 and not including channel parts 10 for the element are protected by masking as shown with Kapton tapes 7 in FIG. 7A, APTES is applied to a region 8 including the channel parts in FIG. 7A, as necessary, and a carbon nanotube dispersion is then applied thereto. After removing the protective mask, upper electrodes (contact electrodes) 9 are produced in such a manner that they are connecting to electrode pads 6 and in contact with the top of the carbon nanotube film 8 as illustrated with black dotted lines 9 in FIG. 7A. FIG. 7B shows an x-x' cross-section of one electrode pair in FIG. 7A. Each detection electrode such as the electrode pads 6 may contain a lower-work-function metal in a part thereof, and may be produced with a metal that forms good adhesion to a substrate of Ti, Cr, or the like. On the other hand, the contact electrodes 9 indicated by black dotted lines are each composed of a higher-work-function metal or alloy, giving a configuration in which carbon nanotubes are in contact only with the higher-work-function metal.

Although any material may be used for masking the electrode pad parts 6 without limitation, materials that can be completely removed after masking are desired; for example, a pressure-sensitive adhesive tape such as a Kapton tape or a patterned resist can be used. The mask may be removed at any time before producing electrodes on carbon nanotubes after application of APTES because the carbon nanotube dispersion is repelled on a part of the substrate without APTES and the carbon nanotube film is formed only on an APTES-coated part, but it is desirable that the mask be removed after producing the carbon nanotube film so as not to allow carbon nanotubes to connect to the lower electrodes (detection electrodes) at all.

In the mode shown above in (1-2-1) to (1-2-4), in which a part of an electrode is configured with a metal having lower work function than the carbon nanotubes, it is preferable to use a metal that forms good adhesion to the substrate for parts in contact with the substrate. Examples of such metals include Ti, Cr, Cu, and an alloy containing any of them.

Figure 7A:
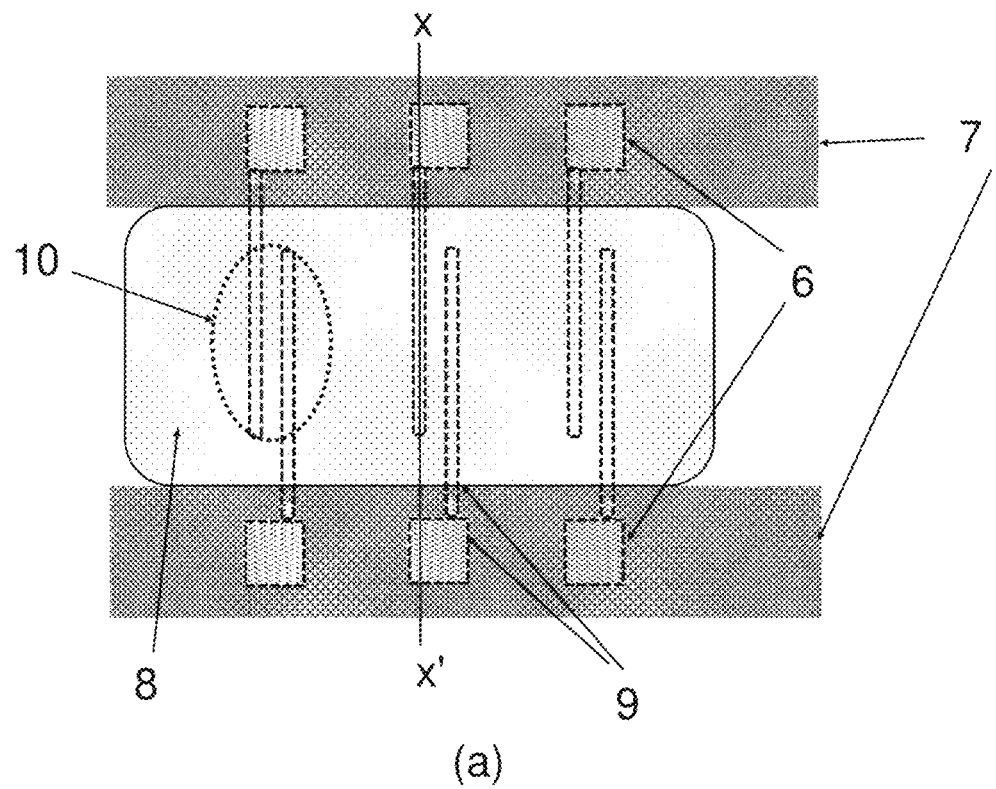
FIGS. 7A and 7B are schematic views (FIG. 7A is a planar view and FIG. 7B is an x-x' cross-sectional view) illustrating an example of the element structure of the bolometer of the present invention.
Figure 7B:
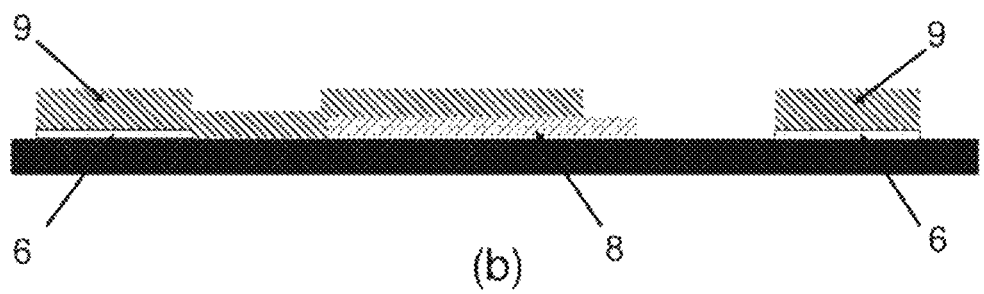

Although FIGS. 2A to 4N and FIGS. 7A and 7B attached to the present specification illustrate the situation that parts B of electrodes in contact with the substrate and parts A formed on the parts B are each composed of a single layer in (1-2-1) to (1-2-4) shown above, the parts A and the parts B may be each formed of two or more layers. In FIG. 7A, for example, the lower detection electrodes 6 (parts B) themselves may be each configured with two or more layers through the use of a metal that forms good adhesion for the first layer (the layer in contact with the substrate) and a metal to be used for the upper contact electrodes 9 (parts A) in FIG. 7A or another metal that forms good junctions to the metal to be used for the electrodes A for the second layer to be formed on the first layer (the layer in contact with the substrate).

Embodiment 2: An Embodiment with Electrodes Comprising a Lower-Work-Function Monometal or Alloy in a Low Proportion For a bolometer comprising a bolometer film with p-type semiconducting carbon nanotubes, an electrode containing a monometal or alloy having lower work function than the p-type semiconducting carbon nanotubes in a low proportion may be used. Also in this case, if the amount of the lower-work-function monometal or alloy is very small and linear or almost linear IV characteristics are given, high TCR is successfully exhibited in a considerably broad voltage range, even though there is slight influence of a Schottky component at positive high voltages. With the form containing a Schottky component, particularly high TCR is successfully exhibited particularly in the negative voltage region and in a low-voltage region.

2-1. Using a Metal Comprising a Low Proportion of a Lower-Work-Function Monometal or Alloy for Contact Sites of the Electrodes with the Bolometer Film.

In the present embodiment, a metal comprising a metal having lower work function than the carbon nanotubes in a proportion of 10% by mass or less is used as a metal constituting parts of the electrodes in contact with the bolometer film. The parts of the electrodes in contact with the bolometer film in the present embodiment may be, for example, parts each consisting of a higher-work-function metal in the structures shown above as examples in Embodiment 1, such as parts shown as the parts A. The metal comprising a lower-work-function metal in a low proportion may be used for one of the electrodes or both of the electrodes.

The proportion of the lower-work-function metal is 10% by mass or less, preferably 5% by mass or less, and more preferably 1% by mass or less of the amount of the metal constituting the parts. The lower limit is not limited, and the proportion is more than 0% by mass, and preferably 0.01% by mass or more, and more preferably 0.05% by mass or more for improved TCR particularly in the negative voltage region and in a low-voltage region. The numerical value may be changed according to metals to be used.

Figure 5O:
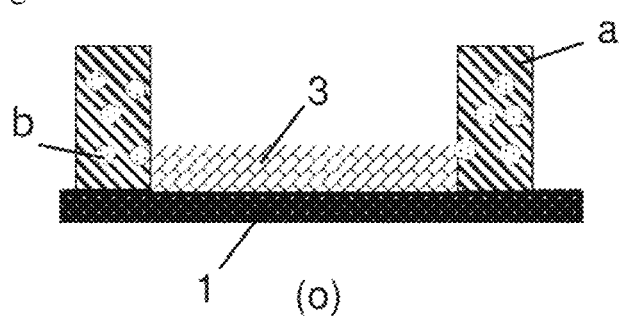
FIGS. 5O and 5P are schematic views (vertical cross-sectional views) illustrating examples of the structure of electrodes in the bolometer of the present invention.
Figure 5P:
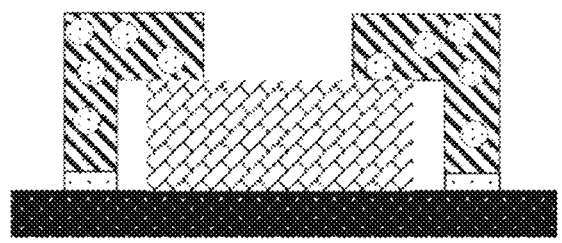

Thus, the mode of the lower-work-function metal mixing in a low proportion (at an impurity level) is not limited; for example, the parts can be configured with a metal in which the lower-work-function metal in a low proportion (e.g., at an impurity level) is mixing, for example, dispersed in a metal having higher work function than the carbon nanotubes (FIG. 5O, FIG. 5P).

While an alloy is a metal formed through alloying of two or more metals having different work functions to provide one work function, a metal in which two or more metals are mixing together as in the present embodiment has two or more different work functions.

The form of the lower-work-function metal mixing in a low proportion is not limited, and, for example, particulate as shown in FIGS. 5O and 5P. The lower-work-function metal may be in contact with the bolometer film or not, but is preferably in contact at least in some parts. Examples of methods for producing such electrodes include vapor deposition and a sputtering method with a vapor deposition source containing an impurity metal at a specific ratio, a multi-source deposition method, a combinatorial sputtering method, and a multi-source sputtering method.

2-2. Setting the Contact Area with the Lower-Work-Function Monometal or Alloy in a Low Proportion In the present embodiment, the electrodes are configured in such a manner that the area in which the lower-work-function metal and the bolometer film are in contact is 10% or less of the total area in which the electrodes and the bolometer film are in contact. The lower-work-function metal may be used for one of the electrodes or both of the electrodes. The proportion of the lower-work-function metal in contact with the bolometer film is 10% or less, preferably 5% or less, and more preferably 1% or less. The lower limit is not limited, and the proportion is more than 0%, and preferably 0.01% or more, and more preferably 0.05% or more for improved TCR particularly in the negative voltage region and in a low-voltage region. The numerical value may be changed according to metals to be used.

Figure 6Q:
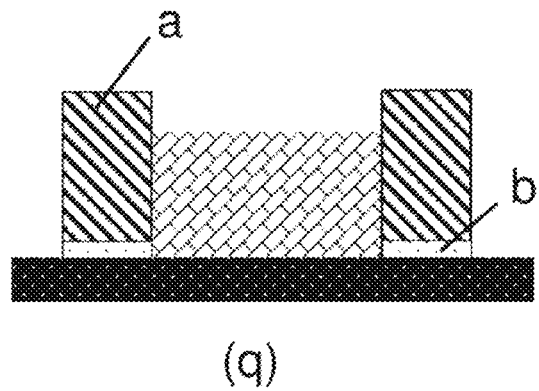
FIGS. 6Q to 6S are schematic views (vertical cross-sectional views) illustrating examples of the structure of electrodes in the bolometer of the present invention.
Figure 6R:
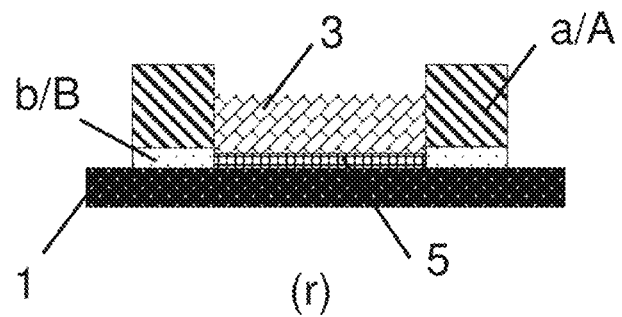
Figure 6S:
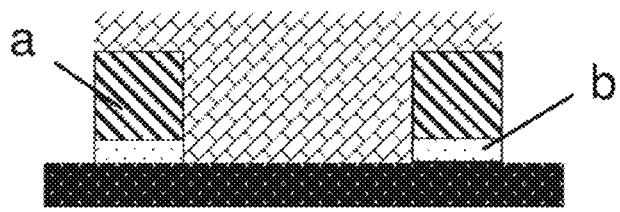

Thus, the mode with the contact area of the lower-work-function metal being in a low proportion is not limited; for the structure of electrodes as shown in FIG. 6Q, in which parts A each consisting of a higher-work-function metal a are laminated on parts B each consisting of a lower-work-function metal b, the contact area of the lower-work-function metal can be set in a low proportion by adjusting the thickness of each part B consisting of the lower-work-function metal b in contact with the bolometer film. For the case as in (1-2-2) of Embodiment 1, in which a part of each electrode is configured with a metal having lower work function than the carbon nanotubes, the contact area of the lower-work-function metal can be set in a low proportion by providing a part consisting of a material to prevent the contact with carbon nanotubes to parts in which the lower-work-function metal and the carbon nanotube film are to be in contact (FIG. 6R). As shown in FIG. 6S, the contact area of the lower-work-function metal can be set in a low proportion by increasing the thickness of the bolometer film.

Embodiment 3: An Embodiment with n-Type Semiconducting Carbon Nanotubes in Addition to p-Type Semiconducting Carbon Nanotubes Examples of alternative methods to achieve IV characteristics such that a Schottky-type IV component is overlapping with an ohmic linear IV component as shown above in Embodiment 2 include a method of using n-type semiconducting carbon nanotubes in addition to p-type semiconducting carbon nanotubes for the bolometer film with p-type semiconducting carbon nanotubes. As described above, the relationship of p-type semiconducting carbon nanotubes with the work function of a metal used for an electrode and that of n-type semiconducting carbon nanotubes are reverse to each other. Accordingly, replacing some of the p-type semiconducting carbon nanotubes with n-type semiconducting carbon nanotubes gives IV characteristics such that a Schottky-type IV component is overlapping with an ohmic linear IV component, resulting in high TCR in a considerably broad voltage region, specifically, particularly high TCR particularly in the negative voltage region.

The proportion of the n-type semiconducting carbon nanotubes is not limited, and is preferably 10% by mass or less, more preferably 5% by mass or less, and even more preferably 1% by mass or less to the total of the p-type semiconducting carbon nanotubes and n-type semiconducting carbon nanotubes. The lower limit is not limited, and the proportion is more than 0% by mass, and preferably 0.01% by mass or more, and more preferably 0.05% by mass or more for achieving particularly high TCR in the negative voltage region.

Also for a bolometer comprising a bolometer film with n-type semiconducting carbon nanotubes, replacing some of the n-type semiconducting carbon nanotubes with p-type semiconducting carbon nanotubes gives IV characteristics such that a Schottky-type IV component is overlapping with an ohmic linear IV component, similarly.

FIGS. 2A to 7B have shown examples of the structure of the electrodes in the bolometer of the present embodiment, but the structure of the electrodes is not limited to them.

In an embodiment, it is preferable that the bolometer include two electrodes provided on a substrate.

It is preferable that the bolometer of the present embodiment include a structure in which a bolometer film lies between two electrodes provided on a substrate to connect the two electrodes, as shown above in FIGS. 2A to 6S. In this case, the side wall of each of the two electrodes in the carbon nanotube film side is in contact with the carbon nanotube film as shown with the dashed circle in FIG. 2A. Such a structure advantageously allows the carbon nanotube film to be readily produced homogeneously and readily brought into close contact with the electrodes. A structure as shown in FIG. 2D may be employed in which carbon nanotubes are in contact with the side wall of each electrode and with a part of the top surface of each electrode.

Figure 4N:
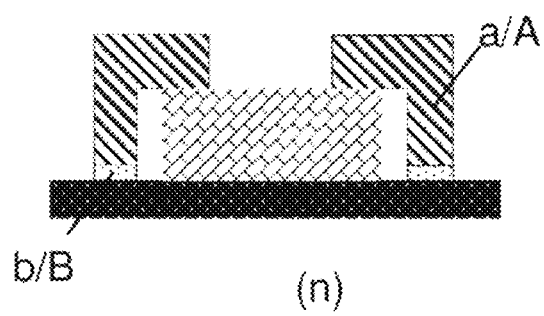

In another embodiment, a structure may be employed in which carbon nanotubes are not in contact with the side wall of each electrode but in contact with the lower side of each electrode as shown in FIG. 4N, and a structure in which a carbon nanotube film bridges two electrodes provided on a substrate can be employed (not shown).

The contact surface in which each electrode and carbon nanotubes are in contact may be a vertical surface, an uneven surface, or a smooth curved surface.

In an embodiment, it is preferable that the two electrodes be structurally identical. If being structurally identical, the two electrodes can be produced at the same time through the same process, which results in a simplified production process.

The distance between the two electrodes is preferably 1 µm to 500 µm, and for miniaturization, it is more preferably 5 to 200 µm. When the distance is 5 µm or more, a reduction in the nature of TCR can be suppressed, even in the case of containing a small amount of metallic carbon nanotubes, for example. In addition, the distance of 500 µm or less is advantageous when it is applied to an image sensor using a two-dimensional array.

With respect to the channel direction of an element, FIGS. 2A to 6S have shown examples of the structure in which currents primarily flow between two electrodes shown in the right and left in each diagram; however, those diagrams only schematically show the contact relationship between the carbon nanotube film and the metals constituting the electrodes, and thus the ratio between height and width and the relationship between the two electrodes and the direction of the channel are not limited to those examples of the structure, and the structure of the electrodes may be changed according to the application or scale of the bolometer. For the case as shown in FIGS. 7A and 7B, in which lower electrodes (detection electrodes) and upper electrodes (contact electrodes) are combined, the directions of the channels can be changed to desired directions by changing the structure of the electrodes.

Any method may be used for producing the electrodes, without limitation, and the electrodes may be formed, for example, by vapor deposition, sputtering, a printing method, or a pressing method. In this case, a desired shape may be formed by using a photomask, a metal mask, or the like. A preformed metal thin film, alloy film, or the like may be used.

(Bolometer Film)

For the bolometer of the present embodiment, a carbon nanotube film comprising carbon nanotubes is used for the bolometer film.

The carbon nanotube film (CNT film) as a bolometer film is a thin film composed of a plurality of carbon nanotubes forming conductive paths which electrically connect the two electrodes. Carbon nanotubes for example, preferably have a network-like structure, and preferably form a three-dimensional network structure because aggregation is less likely to occur and uniform conductive paths can be obtained.

At least some of the carbon nanotubes in the network of the carbon nanotubes may be oriented.

As the carbon nanotubes, single-walled, double-walled, and multi-walled carbon nanotubes may be used, but when semiconducting carbon nanotubes are separated, single-walled or few-walled (for example, double-walled or triple-walled) carbon nanotubes are preferred, and single-walled carbon nanotubes are more preferred. The carbon nanotubes preferably comprise single-walled carbon nanotubes in an amount of 80% by mass or more, and more preferably 90% by mass or more (including 100% by mass).

The carbon nanotubes, which are each a p-type semiconductor in their natural states, may be each transformed into an n-type semiconducting for use as described above. Methods used in the art for transforming a p-type semiconducting into an n-type semiconducting can be used without limitation, and examples thereof include a method of heating in vacuum, which is described in V. Derycke et al., Nano Letters, 1, 453 (2001), and a method with chemical doping, which is described in D. Suzuki et al., ACS Appl. Nano Mater, 1, 2469 (2018).

The diameter of the carbon nanotubes is preferably between 0.6 and 1.5 nm, more preferably 0.6 nm to 1.4 nm, and further preferably 0.7 to 1.2 nm, from the viewpoint of increasing the band gap to improve TCR. In one embodiment, the diameter of 1 nm or less may be particularly preferred in some cases. When the diameter is 0.6 nm or more, the manufacture of carbon nanotubes becomes much easier. When the diameter is 1.5 nm or less, the band gap is easily maintained in an appropriate range and a high TCR can be obtained.

As used herein, the diameter of the carbon nanotubes means that when the carbon nanotubes film is observed using an atomic force microscope (AFM) and the diameter thereof is measured at about 100 positions, 60% or more, preferably 70% or more, optionally preferably 80% or more, more preferably 100% thereof is within a range of 0.6 to 1.5 nm. It is preferred that 60% or more, preferably 70% or more, optionally preferably 80% or more, and more preferably 100% thereof be within a range of 0.6 to 1.4 nm, and further preferably within a range of 0.7 to 1.2 nm. In an embodiment, 60% or more, preferably 70% or more, optionally preferably 80% or more, and more preferably 100% thereof is within a range of 0.6 to 1 nm.

The length of the carbon nanotubes is preferably between 100 nm to 5 µm because dispersion is easy and application properties are excellent. Also, from the viewpoint of conductivity of the carbon nanotubes, the length is preferably 100 nm or more. When the length is 5 µm or less, aggregation upon forming a film is easily suppressed. The length of the carbon nanotubes is more preferably 300 nm to 3 µm, and further preferably 500 nm to 1.5 µm.

As used herein, the length of the carbon nanotubes means that, when at least 100 carbon nanotubes are observed using an atomic force microscope (AFM) and enumerated to measure the distribution of the length of the carbon nanotubes, 60% or more, preferably 70% or more, optionally preferably 80% or more, and more preferably 100% thereof is within a range of 100 nm to 5 µm. It is preferred that 60% or more, preferably 70% or more, optionally preferably 80% or more, and more preferably 100% thereof be within a range of 300 nm to 3 µm, and it is more preferred that 60% or more, preferably 70% or more, optionally preferably 80% or more, and more preferably 100% thereof be within a range of 500 nm to 1.5 µm.

When the diameter and length of the carbon nanotubes are within the above range, the influence of semiconductive properties becomes large and a large current value can also be obtained, and thus, a high TCR value is likely to be obtained when the carbon nanotubes are used as a bolometer film.

If the carbon nanotubes are excessively long, the carbon nanotube film is formed in such a manner that the carbon nanotube film rides over the two electrodes, which may result in insufficient contact between carbon nanotubes and the electrode walls (side walls) of the two electrodes, in particular, contact failure between carbon nanotubes and the side walls in basal regions of the electrodes; if the length of each carbon nanotube is within the above range, on the other hand, improved adhesion is successfully provided between carbon nanotubes in the carbon nanotube film and the electrode walls. Accordingly, if carbon nanotubes each having a length within the above range are used, it is preferable to configure the inner (in the carbon nanotube film side) side walls of the two electrodes, in particular, the side walls in basal regions of the electrodes in contact with the carbon nanotube film, with a metal having higher work function than the carbon nanotubes.

It is preferable that semiconducting carbon nanotubes that have large band gaps and high carrier mobility are used for the bolometer film. The content of semiconducting carbon nanotubes, preferably of semiconducting single-walled carbon nanotubes in the carbon nanotubes is typically 67% by mass or more, preferably 70% by mass or more, and more preferably 80% by mass or more, particularly preferably 90% by mass or more, more preferably of 95% by mass or more, even more preferably of 99% by mass or more (including 100% by mass) to the total amount of the carbon nanotubes.

The thickness of the bolometer film is not limited, in the range of, for example, 1 nm or more, for example a few nm to 10 μm, preferably 10 nm to 10 μm, more preferably 15 nm to 1 μm, further preferably 20 nm to 500 nm, particularly preferably 20 nm to 200 nm or more.

When the thickness of the bolometer film is 1 nm or more, a good light absorption rate can be achieved.

When the thickness of the carbon nanotube film is 10 nm or more, preferably 30 nm or more, the element structure can be made simpler because an adequate light absorption rate is obtained even without comprising a light reflection layer or a light absorbing material layer.

In addition, from the view point of simplifying the manufacturing method, it is preferred that the thickness of the bolometer film is 1 μm or less, preferably 500 nm or less. Also, when the bolometer film is too thick, the contact electrode formed by vapor deposition or the like from above may not fully contact the carbon nanotubes at the bottom side of the bolometer film, and the effective resistance value becomes higher, but when the thickness is within the above range, increase of the resistance value can be suppressed.

Also, when the thickness of the bolometer film is in the range of 10 nm to 1 μm as described above, it is also preferable that printing techniques can be suitably applied to the manufacturing method of the bolometer film.

Also, in the case of comprising a light reflection layer or a light absorbing material layer, it is also possible to make the bolometer film thinner than the above range in order to further simplify the manufacturing process and improve the resistance value.

The thickness of the bolometer film can be determined as an average value of the thickness of the carbon nanotube film measured at arbitrary 10 positions.

The density of the bolometer film is, for example, 0.3 g/cm$^3$ or more, preferably 0.8 g/cm$^3$ or more, more preferably 1.1 g/cm$^3$ or more. The upper limit thereof is not particularly limited, but can be the upper limit of the true density of the carbon nanotube used (for example, about 1.4 g/cm$^3$).

When the density of the bolometer film is 0.3 g/cm$^3$ or more, a good light absorption rate can be achieved.

When the density of the bolometer film is 0.5 g/cm$^3$ or more, it is preferred that the element structure can be simplified because an adequate light absorption rate is obtained even without comprising a light reflection layer or a light absorbing layer.

Also, when a light reflection layer or a light absorbing material layer is comprised, the density of the bolometer film of lower than the above-described density may be appropriately employed.

The density of the bolometer film can be calculated from weight, area, and the thickness obtained as above of the bolometer film.

In addition to the above-mentioned components described above, ionic conductors (surfactants, ammonium salts, inorganic salts), resins, organic binding agents, and the like may also be appropriately used in the bolometer film.

The content of carbon nanotubes in the bolometer film can be selected appropriately, and preferably more than 0.10% by mass or more based on the total mass of the bolometer film is effective, more preferably 1% by mass or more is effective, for example 30% by mass, and even 50% by mass or more may be preferred, and in some cases 60% by mass or more may be preferred.

An example of a method for manufacturing a carbon nanotube film used as a bolometer film is described in detail below.

From the carbon nanotubes, surface functional groups and impurities such as amorphous carbon, catalysts, and the like may be removed by performing a heat treatment under an inert atmosphere, in a vacuum. The heat treatment temperature may be appropriately selected and is preferably 800 to 2000° C., and more preferably 800 to 1200° C.

The carbon nanotube film can be produced with a carbon nanotube dispersion containing carbon nanotubes and a surfactant.

The surfactant is preferably a nonionic surfactant from the viewpoint of easy removal.

The nonionic surfactant may be appropriately selected, and it is preferred to use nonionic surfactants constituted by a hydrophilic portion which is not ionized and a hydrophobic portion such as an alkyl chain, for example, nonionic surfactants having a polyethylene glycol structure exemplified by polyoxyethylene alkyl ethers, and alkyl glucoside based nonionic surfactants, singly or in combination. As such a nonionic surfactant, polyoxyethylene alkyl ether represented by Formula (1) is preferably used. In addition, the alkyl moiety may have one or a plurality of unsaturated bonds.

$$C_nH_{2n+1}(OCH_2CH_2)_mOH \tag{1}$$

wherein, n=preferably 12 to 18, and m=10 to 100, and preferably 20 to 100.

In particular, a nonionic surfactant specified by polyoxyethylene (n) alkyl ether (wherein n=20 or more and 100 or less, and the alkyl chain length is C12 or more and C18 or less) such as polyoxyethylene (23) lauryl ether, polyoxyethylene (20) cetyl ether, polyoxyethylene (20) stearyl ether, polyoxyethylene (10) oleyl ether, polyoxyethylene (10) cetyl ether, polyoxyethylene (10) stearyl ether, polyoxyethylene (20) oleyl ether, polyoxyethylene (100) stearyl ether is more preferred. In addition, N, N-bis[3-(D-gluconamido)propyl]deoxycholamide, n-dodecyl-β-D-maltoside, octyl-β-D-glucopyranoside, and digitonin may also be used.

As the nonionic surfactant, polyoxyethylene sorbitan monostearate (molecular formula: $C_{64}H_{126}O_{26}$, trade name: Tween 60, manufactured by Sigma-Aldrich, etc.), polyoxyethylene sorbitan trioleate (molecular formula: $C_{24}H_{44}O_6$, trade name: Tween 85, manufactured by Sigma-Aldrich, etc.), octylphenol ethoxylate (molecular formula: $C_{14}H_{22}O$ $(C_2H_4O)_n$, n=1 to 10, trade name: Triton X-100, manufactured by Sigma-Aldrich, etc.), polyoxyethylene (40) isooctylphenyl ether (molecular formula: $C_8H_{17}C_6H_{40}$  $(CH_2CH_{20})_{40}H$, trade name: Triton X-405, manufactured by Sigma-Aldrich, etc.), poloxamer (molecular formula: $C_5H_{10}O_2$, trade name: Pluronic, manufactured by Sigma-Aldrich, etc.), polyvinyl pyrrolidone (molecular formula: $(C_6H_9NO)_n$, n=5 to 100, manufactured by Sigma-Aldrich, etc.) and the like may be used.

Use of a nonionic surfactant improves the dispersibility of the carbon nanotubes.

Nonionic surfactants can be removed with ease through thermal treatment described later or the like, leaving reduced residues thereof in the carbon nanotube film, which leads to the successful formation of satisfactory junctions between the electrodes and the carbon nanotube film. Accordingly, it is preferable in an embodiment to remove a surfactant in the bolometer film to reduce the amount of the residual surfactant, and it is preferable in an embodiment that the bolometer film contain substantially no surfactant. The statement that the bolometer film contains substantially no surfactant means that the concentration of a residual surfactant is preferably 0.01% by mass or less, and more preferably 0.001% by mass or less (including 0% by mass) to the total mass of the bolometer film.

Conventional bolometer films do not allow the formation of Schottky junctions when Ti/Au electrodes, which are used for transistors and the like, specifically, a structure in which a Ti layer is included as an adhesion layer between each Au electrode and a substrate is used for bolometers, because a remaining surfactant or the like prevents bolometer films and Ti layers from jointing together. For the bolometer of the present embodiment, on the other hand, use of a nonionic surfactant, which can be removed with ease, leads to reduced remaining impurities in the bolometer film, which may allow the formation of Schottky junctions between the bolometer film and Ti/Au electrodes, whereas, in this case, the bolometer, which detects resistance change accompanied by temperature change, may exhibit lowered TCR particularly in a high-voltage region because of the Schottky-type IV characteristics. However, the bolometer of the present embodiment, for which specific electrodes are used, allows the formation of ohmic junctions between the electrodes and the bolometer film, as described above. As a result, lowering of TCR is successfully inhibited and high TCR is exhibited in a broad voltage region.

The method for obtaining a dispersion liquid of carbon nanotubes is not particularly limited, and conventionally known methods can be applied. For example, a carbon nanotube mixture, a dispersion medium, and a nonionic surfactant are mixed to prepare a solution containing carbon nanotubes, and this solution is subjected to sonication to disperse the carbon nanotubes, thereby preparing a carbon nanotube dispersion liquid (micelle dispersion solution). The dispersion medium is not particularly limited, as long as it is a solvent that allows carbon nanotubes to disperse and suspend during the separation step, and for example, water, heavy water, an organic solvent, an ionic liquid, or a mixture thereof may be used, and water and heavy water are preferred. In addition to or instead of the sonication mentioned above, a technique of dispersing carbon nanotubes by a mechanical shear force may be used. The mechanical shearing may be performed in a gas phase. In a micelle dispersion aqueous solution of the carbon nanotubes and the nonionic surfactant, the carbon nanotubes are preferably in an isolated state. Thus, if necessary, bundles, amorphous carbon, impurity catalysts, and the like may be removed using an ultracentrifugation treatment. During the dispersion treatment, the carbon nanotubes can be cut, and the length thereof can be controlled by changing the grinding conditions of the carbon nanotubes, ultrasonic output, ultrasonic treatment time, and the like. For example, the aggregate size can be controlled by grinding the untreated carbon nanotubes using tweezers, a ball mill, or the like. After these treatments, the length can be controlled to 100 nm to 5 µm using an ultrasonic homogenizer by setting the output to 40 to 600 W, optionally 100 to 550 W, 20 to 100 KHz, the treatment time to 1 to 5 hours, preferably up to 3 hours. When the treatment time is shorter than 1 hour, the carbon nanotubes may be hardly dispersible depending on the conditions, and may remain almost the original length in some cases. From the viewpoint of shortening the dispersion treatment time and reducing the cost, the treatment time is preferably 3 hours or less. The present embodiment may also have the advantage of ease of adjustment of cutting due to use of a nonionic surfactant. In addition, it has the advantage of containing no ionic surfactant which is difficult to be removed.

Dispersion and cutting of the carbon nanotubes generate a surface functional group at the surface or the end of the carbon nanotube. Functional groups such as carboxyl group, carbonyl group, and hydroxyl group are generated. When the treatment is performed in a liquid phase, a carboxyl group and a hydroxyl group are generated, and when the treatment is performed in a gas phase, a carbonyl group is generated.

The concentration of the surfactant in the liquid comprising heavy water or water and a nonionic surfactant mentioned above is preferably from the critical micelle concentration to 10% by mass, and more preferably from the critical micelle concentration to 3% by mass. The concentration less than the critical micelle concentration is not preferred because dispersion is impossible. When the concentration is 10% by mass or less, a sufficient density of carbon nanotubes can be applied after separation, while reducing the amount of surfactant. As used herein, the critical micelle concentration (CMC) refers to the concentration serving as an inflection point of the surface tension measured by, for example, changing the concentration of an aqueous surfactant solution using a surface tensiometer such as a Wilhelmy surface tensiometer at a constant temperature. As used herein, the "critical micelle concentration" is a value under atmospheric pressure at 25° C.

The concentration of the carbon nanotubes in the above cutting and dispersion step (the weight of the carbon nanotubes/(the total weight of the carbon nanotubes, the dispersion medium and the surfactant)×100) is not particularly limited, and for example, may be 0.0003 to 10% by mass, preferably 0.001 to 3% by mass, and more preferably 0.003 to 0.3% by mass.

The dispersion liquid obtained through the aforementioned cutting and dispersion step may be used as it is in the separation step mentioned below, or steps such as concentration and dilution may be performed before the separation step.

Separation of the semiconducting carbon nanotubes and the metallic carbon nanotubes can be performed by, for example, the electric-field-induced layer formation method (ELF method: see, for example, K. Ihara et al. J. Phys. Chem. C. 2011, 115, 22827 to 22832 and Japanese Patent No. 5717233, which are incorporated herein by reference). One example of the separation method using the ELF method will be described. Carbon nanotubes, preferably single-walled carbon nanotubes are dispersed by a nonionic surfactant, and the dispersion liquid is put into a vertical separation apparatus, and then a voltage is applied to the electrodes arranged above and below, so that the carbon nanotubes are separated by free flow electrophoresis. The mechanism of separation can be inferred as follows for example. When the carbon nanotubes are dispersed by the nonionic surfactant, the micelle of the semiconducting carbon nanotubes has a negative zeta potential, whereas the micelle of the metallic carbon nanotubes has an opposite (positive) zeta potential (in recent years, it is considered that the metallic carbon nanotubes have a slightly negative zeta potential or are barely charged). Thus, when an electric field is applied to the carbon nanotube dispersion liquid, the micelle of the semiconducting carbon nanotubes is electrophoresed toward the anode (+) direction, and the micelle of the metallic carbon nanotubes is electrophoresed toward the cathode (−) direction by the difference between the zeta potentials, and the like. Eventually, the layer in which the semiconducting carbon nanotubes are concentrated is formed near the anode, and the layer in which the metallic carbon nanotubes are concentrated is formed near the cathode in the separation tank. The voltage for separation may be appropriately set in consideration of the composition of the dispersion medium, the charge amount of carbon nanotubes, and the like, and is preferably 1 V or more and 200 V or less, and more preferably 10 V or more and 200 V or less. It is preferably 100 V or more from the viewpoint of shortening the time for the separation step. It is preferably 200 V or less from the viewpoint of suppressing the generation of bubbles during separation and maintaining the separation efficiency. The purity is improved by repeating separation. The same separation procedure may be performed by resetting the dispersion liquid after separation to the initial concentration. As a result, the purity can be further increased.

Through the aforementioned dispersion and cutting step and separation step of the carbon nanotubes, a dispersion liquid in which the semiconducting carbon nanotubes having the desired diameter and length are concentrated can be obtained. As used herein, the carbon nanotube dispersion liquid in which semiconducting carbon nanotubes are concentrated may be referred to as the "semiconducting carbon nanotube dispersion liquid". The semiconducting carbon nanotube dispersion liquid obtained by the separation step comprises semiconducting carbon nanotubes generally 67% by mass or more, preferably 70% by mass or more, more preferably 80% by mass or more in the total amount of carbon nanotubes, and it is particularly preferably 90% by mass or more, more preferably 95% by mass or more, further preferably 99% by mass or more (the upper limit may be 100% by mass). The separation tendency of the metallic and semiconducting carbon nanotubes can be analyzed by microscopic Raman spectroscopy and ultraviolet-visible near-infrared absorptiometry.

The centrifugation treatment may be performed to remove the bundles, amorphous carbon, metal impurities, and the like in the carbon nanotube dispersion liquid after the aforementioned dispersion and cutting step of the carbon nanotubes and before the separation step. The centrifugal acceleration may be appropriately adjusted, and is preferably 10000×g to 500000×g, more preferably 50000×g to 300000×g, and optionally 100000×g to 300000×g. The centrifugation time is preferably 0.5 hours to 12 hours, and more preferably 1 to 3 hours. The centrifugation temperature may be appropriately adjusted, and is preferably 4° C. to room temperature, and more preferably 10° C. to room temperature.

The concentration of the surfactant in the carbon nanotube dispersion liquid after separation which is used for the application may be appropriately controlled. The concentration of the surfactant in the carbon nanotube dispersion liquid is preferably from the critical micelle concentration to about 5% by mass, more preferably, 0.001% by mass to 3% by mass, and particularly preferably 0.01 to 1% by mass to suppress the reaggregation after application and the like.

The concentration of the surfactant in the carbon nanotube dispersion is preferably 0.1% by mass or less for reduction of the surfactant remaining in the carbon nanotube film to form satisfactory junctions between the carbon nanotube film and the electrodes.

The semiconducting carbon nanotube dispersion liquid obtained by the process described above can be applied on a predetermined base material, dried, and, optionally heat treated to form a bolometer film.

The method for applying the semiconducting carbon nanotube dispersion liquid to a predetermined base material is not particularly limited, and examples thereof include dropping method, spin coating, printing, inkjet, spray coating, dip coating, and the like. From the viewpoint of reducing the manufacturing cost, a printing method is preferred. The printing methods can include application (dispenser, inkjet or the like), transferring (microcontact print, gravure printing, or the like) and the like.

The semiconducting carbon nanotubes dispersion liquid applied on a desired base material may be subjected to a heat treatment to remove the surfactant and the solvent. The temperature of the heat treatment may be appropriately set as long as it is equal to or higher than the decomposition temperature of the surfactant, and it is preferably 150 to 500° C., and more preferably 160 to 500° C., for example 180 to 400° C. A temperature of 180° C. or more is preferred because the remaining of the decomposition product of the surfactant can be easily suppressed. A temperature of 500° C. or less, for example 400° C. or less is preferred because the change in the quality of the substrate or other components can be suppressed. Also, the decomposition of carbon nanotubes, the change in size, the leaving of functional groups, and the like can be suppressed.

(Substrate)

The substrate may be either a flexible substrate or a rigid substrate, and may be appropriately selected, and those in which at least the element forming surface has insulating property or semiconducting property are preferred. For examples, inorganic materials such as Si, $SiO_2$-coated Si, $SiO_2$, SiN, glass and the like, and organic materials such as polymers, resins, plastics, for examples, parylene, polyimide, polyethylene, polypropylene, polystyrene, polyvinyl chloride, polyethylene terephthalate, acrylonitrile styrene resin, acrylonitrile butadiene styrene resin, fluororesin, methacrylic resin, polycarbonate and the like, but is not limited thereto.

The surface of the substrate may be treated with a material to enhance the adhesion of the carbon nanotubes, such as APTES (3-aminopropyltriethoxysilane).

As used herein, the term "substrate" means any base material on which a bolometer film and the electrode of the present embodiment are formed, where the base material supports the bolometer film and the electrode. The "substrate" is not limited to a base material in a flat plate form such as a glass plate or a silicon wafer, and may have a structured body or a multilayer structure. Therefore, the bolometer of the present embodiment is not limited to the form shown in FIG. 1, but is also applicable to a bolometer having a diaphragm structure, or a bolometer having any layer such as a heat insulation layer under the bolometer film. For example, in the case of a bolo meter having a diaphragm structure, a diaphragm with a gap as a heat insulation structure is provided, and the bolometer film and the electrode of the present embodiment are provided thereon, in which case the entire base material including the diaphragm can be considered as the "substrate". In the case of a bolometer having a heat insulation layer under the bolometer film, the heat insulation layer and any other layers that may be formed thereon as necessary may be considered as the "substrate," on which the bolometer film and the electrode of the present embodiment will be provided.

(Other Components)

In addition to the above, the bolometer of the present embodiment may comprise any other components used for bolometers.

For example, a protective film may be provided on the surface of the bolometer film, if necessary. The protective film is preferably a material with high transparency in the wavelength range of the light to be detected. Examples of the protective film include acrylic resins such as PMMA and PMMA anisole, epoxy resins, Teflon®, silicon nitride, silicon oxide ($SiO_2$), and the like.

A light-absorbing layer may also be provided on the upper side of the bolometer film (the side to which light is incident), as necessary. Examples of the light-absorbing layer to be provided above the protective layer include a thin film of titanium nitride, and the like, and examples of the light-absorbing layer to be provided above the bolometer film include a coating film of polyimide, and the like, but not limited thereto.

[Method for Producing Bolometer]

The bolometer of the present embodiment can be produced, for example, in the following manner. Two electrodes (the first electrode 2 and the second electrode 4) are formed on the substrate 1, for example, by vapor deposition, a sputtering method, or application. A dispersion containing semiconducting carbon nanotubes is applied onto the substrate 1 including the two electrodes formed thereon, and dried to form the bolometer film 3 lying between the two electrodes to connect the two electrodes. As necessary, impurities such as an excessive portion of a solvent and a surfactant are removed through thermal treatment or the like. As necessary, an acrylic resin (PMMA) solution is applied to the region between the electrodes on the bolometer film layer formed to form a PMMA protective layer. Thereafter, the whole of the substrate is subjected to oxygen plasma treatment to remove excessive carbon nanotubes and others present in regions other than the bolometer film layer.

The obtained bolometer of FIG. 1 detects temperature using the temperature dependence of electrical resistance due to light irradiation. Therefore, it can be used to detect it similarly in frequency regions other than the infrared light as well as long as the temperature changes due to light irradiation. The bolometer of the present embodiment using a bolometer film comprising carbon nanotubes can be particularly preferably used for detecting an electromagnetic wave having a wavelength of 0.7 μm to 1 mm. The electromagnetic waves included in this wavelength range include, in addition to infrared ray, terahertz wave. The bolometer of the present embodiment is preferably a bolometer-type infrared detector.

In addition, the detection of the change in electrical resistance caused by temperature change can also be performed not only by the structure of FIG. 1, but also by providing a gate electrode to form an electric field effect transistor and thereby amplifying the change in resistance value.

In addition to the structure shown in FIG. 1, the bolometer of the present embodiment can be applied without any particular restrictions to element structures typically used for bolometers, such as an element with a diaphragm structure, an element with a desired heat insulation structure, instead of a diaphragm structure, and the like.

Although the basic configuration of the bolometer of the present embodiment has been shown hereinbefore, an element structure and array structure applicable to infrared detectors can be applied to the bolometer of the present embodiment, without limitation. For example, the bolometer of the present embodiment may be a single element or may be an array in which a plurality of elements are two-dimensionally arranged such as those used in an image sensor.

The whole or part of the example embodiments disclosed above can be described as, but not limited to, the following supplementary notes.

Supplementary Note 1

A bolometer comprising two electrodes provided on a substrate and a bolometer film lying between the two electrodes to connect the two electrodes, wherein
    the bolometer film comprises p-type semiconducting carbon nanotubes, and
    contact sites of the two electrodes with the bolometer film each consist only of a monometal or alloy having higher work function than the p-type semiconducting carbon nanotubes, or
    the proportion of a monometal or alloy having lower work function than the p-type semiconducting carbon nanotubes in metals constituting the contact sites of the two electrodes with the bolometer film is 10% by mass or less, or the contact area of a monometal or alloy having lower work function than the p-type semiconducting carbon nanotubes with the bolometer film is 10% or less of the total contact area between the electrodes and the bolometer film.

Supplementary Note 2

A bolometer comprising two electrodes and a bolometer film lying between the two electrodes to connect the two electrodes, wherein
    the bolometer film comprises n-type semiconducting carbon nanotubes, and
    contact sites of the two electrodes with the bolometer film each consist only of a monometal or alloy having lower work function than the n-type semiconducting carbon nanotubes, or
    the proportion of a monometal or alloy having higher work function than the n-type semiconducting carbon nanotubes in metals constituting the contact sites is 10% by mass or less, or the contact area of a monometal or alloy having higher work function than the n-type semiconducting carbon nanotubes with the bolometer film is 10% or less of the total contact area between the electrodes and the bolometer film.

Supplementary Note 3

The bolometer according to supplementary note 1, wherein the monometal or alloy having higher work function than the p-type semiconducting carbon nanotubes comprises at least one selected from the group consisting of gold, platinum, copper, cobalt, nickel, carbon, and palladium.

Supplementary Note 4

The bolometer according to supplementary note 2, wherein the monometal or alloy having lower work function than the n-type semiconducting carbon nanotubes comprises at least one selected from the group consisting of titanium, iron, aluminum, silver, tungsten, zinc, chromium, tin, lead, magnesium, manganese, yttrium, niobium, vanadium, zirconium, molybdenum, indium, lanthanum, tantalum, hafnium, bismuth, ruthenium, and rhodium.

Supplementary Note 5

The bolometer according to any one of supplementary notes 1 to 4, wherein at least a part of the bolometer film is in contact with a side wall of each of the two electrodes provided on the substrate.

Supplementary Note 6

The bolometer according to supplementary note 1 or 3, wherein the two electrodes provided on the substrate each comprise a lower electrode in contact with the substrate and an upper electrode connecting to the lower electrode and consisting of a higher-work-function monometal or alloy, and the bolometer film is in contact only with the upper electrodes.

Supplementary Note 7

The bolometer according to any one of supplementary notes 1 to 6, having linear current-voltage characteristics.

Supplementary Note 8

The bolometer according to any one of supplementary notes 1 to 6, having current-voltage characteristics such that Schottky-type current-voltage characteristics are overlapping with linear current-voltage characteristics.

Supplementary Note 9

The bolometer according to any one of supplementary notes 1 to 8, wherein the bolometer film comprises semiconducting single-walled carbon nanotubes in a proportion of 90% by mass or more of carbon nanotubes in the bolometer film.

Supplementary Note 10

The bolometer according to any one of supplementary notes 1 to 7, wherein the two electrodes are identical.

Supplementary Note 11

The bolometer according to supplementary note 1 or 3, wherein the monometal or alloy having higher work function than the p-type semiconducting carbon nanotubes is an alloy of two or more selected from the metals specified in supplementary note 3.

Supplementary Note 12

The bolometer according to supplementary note 2 or 4, wherein the monometal or alloy having lower work function than the n-type semiconducting carbon nanotubes is an alloy of two or more selected from the metals specified in supplementary note 4.

Supplementary Note 13

The bolometer according to any one of supplementary notes 1 to 12, wherein the length of each of the carbon nanotubes is within the range of 100 nm to 5 μm.

Supplementary Note 14

A method for producing a bolometer comprising two electrodes and a bolometer film lying between the two electrodes to connect the two electrodes, the method comprising:
  forming two electrodes on a substrate; and
  producing a bolometer film comprising p-type semiconducting carbon nanotubes in such a manner that the bolometer film connects the two electrodes, wherein contact sites of the two electrodes with the bolometer film each consist only of a monometal or alloy having higher work function than the p-type semiconducting carbon nanotubes, or
  the proportion of a monometal or alloy having lower work function than the p-type semiconducting carbon nanotubes in metals constituting the contact sites of the two electrodes with the bolometer film is 10% by mass or less, or the contact area of a monometal or alloy having lower work function than the p-type semiconducting carbon nanotubes with the bolometer film is 10% or less of the total contact area between the electrodes and the bolometer film.

Supplementary Note 15

A method for producing a bolometer comprising two electrodes and a bolometer film lying between the two electrodes to connect the two electrodes, the method comprising:
  converting carbon nanotubes each into an n-type semiconductor;
  forming two electrodes; and
  producing a bolometer film comprising n-type semiconducting carbon nanotubes in such a manner that the bolometer film connects the two electrodes, wherein contact sites of the two electrodes with the bolometer film each consist only of a monometal or alloy having lower work function than the n-type semiconducting carbon nanotubes, or
  the proportion of a monometal or alloy having higher work function than the n-type semiconducting carbon nanotubes in metals constituting the contact sites of the two electrodes with the bolometer film is 10% by mass or less, or the contact area of a monometal or alloy having higher work function than the n-type semiconducting carbon nanotubes with the bolometer film is 10% or less of the total contact area between the electrodes and the bolometer film.

Supplementary Note 16

The method for producing a bolometer according to supplementary note 14, wherein
  the two electrodes each comprise a lower electrode in contact with the substrate and an upper electrode connecting to the lower electrode and consisting of a monometal or alloy having higher work function than carbon nanotubes, and the method comprises:
  forming the lower electrodes on the substrate;
  protecting regions slightly wider than the lower electrodes with a mask;
  forming the bolometer film;
  removing the mask; and
  forming the upper electrodes in such a manner that each upper electrode connects to the lower electrode thereneath and the bolometer film formed,
  whereby the bolometer film is in contact only with the upper electrodes each consisting of a monometal or alloy having higher work function than the p-type semiconducting carbon nanotubes.

Supplementary Note 17

The method for producing a bolometer according to supplementary note 16, wherein the lower electrodes each comprise a part consisting of a monometal or alloy having lower work function than the p-type semiconducting carbon nanotubes.

Supplementary Note 18

The method for producing a bolometer according to any one of supplementary notes 14 to 17, the method comprising:
subjecting a dispersion comprising carbon nanotubes and a surfactant to carrier-free electrophoresis to prepare a carbon nanotube dispersion comprising semiconducting carbon nanotubes and a surfactant;
producing a bolometer film with the carbon nanotube dispersion comprising the semiconducting carbon nanotubes and the surfactant; and
removing the surfactant from the bolometer film formed.

Supplementary Note 19

The method for producing a bolometer according to supplementary note 18, wherein the surfactant is a nonionic surfactant.

Supplementary Note 20

The method for producing a bolometer according to supplementary note 18 or 19, wherein the removing the surfactant from the bolometer film formed comprises a firing at 160° C. or higher in the atmosphere.

EXAMPLES

Example 1

100 mg of single-walled carbon nanotubes (Meijo Nano Carbon Co., Ltd., EC 1.0 (diameter: about 1.1 to 1.5 nm (average diameter 1.2 nm)) was put in a quartz boat and heat treatment was performed under a vacuum atmosphere using an electric furnace. The heat treatment was performed at a temperature of 900° C. for 2 hours. The weight after heat treatment was reduced to 80 mg, and it was found that the surface functional groups and impurities were removed. After the obtained single-walled carbon nanotubes were fractured with tweezers, 12 mg of which was immersed in 40 ml of an aqueous solution of 1 wt % surfactant (polyoxyethylene (100) stearyl ether) and after sufficient sedimentation, the mixture was subjected to ultrasonic dispersion treatment (BRANSON ADVANCED-DIGITAL SONIFIER apparatus, output: 50 W) for 3 hours. Through this step, aggregates of the carbon nanotubes in the solution were eliminated. Through this procedure, bundles, remaining catalysts, and the like were removed to obtain a carbon nanotube dispersion liquid. The dispersion liquid was applied on a $SiO_2$ substrate and dried at 100° C., which was then observed by an atomic force microscope (AFM) to observe the length and the diameter of carbon nanotubes. As a result, it was found that at least 70% of the single-walled carbon nanotubes had a length within a range of 500 nm to 1.5 µm and the average length thereof was approximately 800 nm.

The above obtained carbon nanotube dispersion liquid was introduced into the separation apparatus having a double tube structure. About 15 ml of water, about 70 ml of the carbon nanotube dispersion liquid, and about 10 ml of 2 wt % aqueous surfactant solution were put into the outer tube of the double tube, and about 20 ml of 2 wt % aqueous surfactant solution was also put into the inner tube. Thereafter, the bottom lid of the inner tube was opened, resulting in a three-layer structure having different surfactant concentrations. A voltage of 200 V was applied with the bottom side of the inner tube being anode, and the upper side of the outer tube being cathode, and semiconducting carbon nanotubes were transferred towards the anode side. On the other hand, metallic carbon nanotubes were transferred towards the cathode side. After 80 hours from the start of separation, semiconducting carbon nanotubes and metallic carbon nanotubes were separated cleanly. The separation step was carried out at room temperature (about 25° C.). The semiconducting carbon nanotube dispersion liquid transferred to the anode side was collected and analyzed using the light absorption spectrum, and it was found that the metallic carbon nanotubes components were removed. It was also found from the Raman spectrum that 99 wt % of the carbon nanotubes in the carbon nanotube dispersion liquid transferred to the anode side were semiconducting carbon nanotubes. The most frequent diameter of the single-walled carbon nanotubes was about 1.2 nm (70% or more), and the average diameter was 1.2 nm.

The surfactant was partially removed from the carbon nanotube dispersion liquid comprising 99 wt % semiconducting carbon nanotubes as described above (the carbon nanotube dispersion liquid transferred to the anode side) to adjust the concentration of the surfactant to be 0.05 wt %. Thereafter, the carbon nanotube dispersion liquid was adjusted into a carbon nanotube dispersion liquid A having a carbon nanotube concentration in the dispersion liquid of 0.01 wt % (referred to as dispersion liquid A). This dispersion liquid A was used to form a carbon nanotube layer.

An Si substrate with $SiO_2$ formed on the surface was subjected to oxygen plasma treatment, and a photoresist was then applied to the substrate as shown in FIGS. 7A and 7B for patterning of electrodes pads for measurement. The electrode pads, a first electrode and a second electrode, were both formed as Ti of 10 nm in thickness and Au of 50 nm in thickness through E-gun vapor deposition, and the resist was lifted off. The Si substrate with the electrode pads was washed with acetone, isopropyl alcohol, and water in order, and organic matters on the surface were removed through oxygen plasma treatment. Thereafter, regions each including electrode pad parts and not including channel parts for the element were protected by masking with Kapton tapes, and the substrate was soaked in 0.5% by volume aqueous solution of APTES for 30 minutes, washed with water, and then dried.

Onto the APTES-coated substrate, approximately 100 µL of CNT dispersion A was dropped, the dispersion was spread over the whole surface of the substrate, and the substrate was left to stand for 30 minutes. The substrate was washed with water and isopropyl alcohol, then dried, removed of the Kapton tapes, and heated at 180° C. in the atmosphere to remove the nonionic surfactant and others. SEM observation of the surface of the substrate found that carbon nanotubes were attached in a random network to the APTES-coated part. The thickness of the carbon nanotube layer was estimated from the SEM observation to be approximately 30 nm on average.

As shown with black dotted lines 9 in FIG. 7A, Au of 100 nm in thickness was formed to overlap with the electrode pads through vapor deposition to form a first electrode and a second electrode on the carbon nanotube film in such a manner that an interval of 100 μm was provided between the electrodes (structure of electrodes: FIG. 4N).

Comparative Example 1

Carbon nanotube dispersion A was prepared in the same manner as in the process of Example 1. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 5 nm in thickness and Au of 200 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

Example 2

Carbon nanotube dispersion A was prepared in the same manner as in the process of Example 1. In the same manner as in Example 1, electrodes pads were formed as Ti of 10 nm in thickness and Pt of 50 nm in thickness on an Si substrate through vapor deposition, the resultant was washed with acetone, isopropyl alcohol, and water in order, and organic matters on the surface were removed through oxygen plasma treatment. Thereafter, the electrode pad parts were protected with Kapton tapes, and the substrate was soaked in 0.5% by volume aqueous solution of APTES for 30 minutes, washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then removed of the Kapton tapes, dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

As shown with black dotted lines 9 in FIG. 7A, Pt of 200 nm in thickness was formed to overlap with the electrode pads through vapor deposition to form a first electrode and a second electrode on the carbon nanotube film in such a manner that an interval of 100 μm was provided between the electrodes (structure of electrodes: FIG. 4N).

Example 3

Carbon nanotube dispersion A was prepared in the same manner as in the process of Example 1. In the same manner as in Example 1, electrodes pads were formed as Ti of 10 nm in thickness and Au of 50 nm in thickness on an Si substrate through vapor deposition, the resultant was washed with acetone, isopropyl alcohol, and water in order, and organic matters on the surface were removed through oxygen plasma treatment. Thereafter, the electrode pad parts were protected with Kapton tapes, and the substrate was soaked in 0.5% by volume aqueous solution of APTES for 30 minutes, washed with water, and then dried.

The Kapton tapes were removed, approximately 100 μL of CNT dispersion A was dropped onto the APTES-coated substrate, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

As shown with black dotted lines 9 in FIG. 7A, Pt of 10 nm in thickness, Au of 20 nm in thickness, and Pt of 170 nm in thickness were formed in the presented order (total thickness: approximately 200 nm) to overlap with the electrode pad parts through vapor deposition to produce a first electrode and a second electrode on the carbon nanotube film in such a manner that an interval of 100 μm was provided between the electrodes (structure of electrodes: FIG. 4N).

Example 4

Carbon nanotube dispersion A was prepared in the same manner as in the process of Example 1. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ni of 20 nm in thickness and Au of 100 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 2C).

Example 5

Carbon nanotube dispersion A was prepared in the same manner as in the process of Example 1. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Cu of 20 nm in thickness and Au of 100 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 2C).

Example 6

Carbon nanotube dispersion A was prepared in the same manner as in the process of Example 1. An Si substrate which is the same as that in Example 1 was subjected to oxygen plasma treatment, and a photoresist was then applied to the substrate for electrode patterning in such a manner that an interval of 120 μm was provided between the electrodes. The electrodes, a first electrode and a second electrode, were formed both as Ti of 20 nm in thickness through E-gun vapor deposition, and the resist was lifted off. Thereafter, a photoresist was again applied for patterning electrodes 10 μm wider than the Ti electrodes on the Ti electrodes in such a manner that an interval of 100 μm was provided between the electrodes. With this pattern, a first electrode and a second electrode were formed both as Au of 100 nm in thickness on Ti through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 3G).

Example 7

Carbon nanotube dispersion A was prepared in the same manner as in the process of Example 1. In addition, carbon nanotube dispersion B containing semiconducting carbon nanotubes with a surfactant concentration of 0.5 wt % (referred to as dispersion B) was prepared. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 5 nm in thickness and Au of 200 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion B was dropped, the dispersion was spread over the whole surface of the substrate, and the substrate was left to stand for 30 minutes, washed with ethanol, and then dried. Onto the resulting substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 50 nm on average (structure of electrodes: FIG. 4J).

Example 8

Carbon nanotube dispersion A was prepared in the same manner as in the process of Example 1. In addition, dispersion C containing titanium dioxide nanoparticles (concentration: 0.1% by mass) dispersed in water was prepared. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 5 nm in thickness and Au of 200 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 30 μL of titanium dioxide dispersion C was dropped, the dispersion was spread over the whole surface of the substrate, and the substrate was washed with water and then dried. Onto the resulting substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that aggregating titanium dioxide particles were attached near the electrodes and carbon nanotubes were attached in a random network on the substrate. The thickness of the carbon nanotube layer was estimated from the SEM observation to be approximately 30 nm on average (structure of electrodes: FIG. 4L).

Example 9

Carbon nanotube dispersion A was prepared in the same manner as in the process of Example 1. In addition, dispersion D containing graphite powder dispersed in water was prepared. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 5 nm in thickness and Au of 200 nm in thickness through E-gun vapor deposition, and the resist was lifted off.

This substrate with the electrodes was washed with acetone, isopropyl alcohol, and water in order, and organic matters on the surface were removed through oxygen plasma treatment. Onto the substrate, approximately 30 μL of graphite dispersion D was dropped, and the substrate was washed with water and then dried. Thereafter, the substrate was soaked in 0.5% by volume aqueous solution of APTES for 30 minutes, washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that aggregating graphite was attached near the electrodes and carbon nanotubes were attached in a random network on the substrate. The thickness of the carbon nanotube layer was estimated from the SEM observation to be approximately 30 nm on average (structure of electrodes: FIG. 4L).

Example 10

Carbon nanotube dispersion A was prepared in the same manner as in the process of Example 1. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 5 nm in thickness and Au of 100 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. Thereafter, stress was applied by tapping near the electrodes on the substrate with tweezers and breaking off edges of the substrate. SEM observation of the surface of the substrate found that carbon nanotubes were attached in a random network on the substrate. The thickness of the carbon nanotube layer was estimated from the SEM observation to be approximately 30 nm on average. The application of stress caused the rising of lower regions (substrate side) of the carbon nanotube layer, resulting in separation of the carbon nanotube layer from the Ti layers of the electrodes without contact (structure of electrodes: FIG. 4M).

Example 11

Carbon nanotube dispersion A was prepared in the same manner as in the process of Example 1. In the same manner as in Example 1, electrodes pads were formed as Ti of 10 nm in thickness and Au of 50 nm in thickness on an Si substrate through vapor deposition, the resultant was washed with acetone, isopropyl alcohol, and water in order, and organic matters on the surface were removed through oxygen plasma treatment. Thereafter, the electrode pad parts were protected with Kapton tapes, and the substrate was soaked in 0.5% by volume aqueous solution of APTES for 30 minutes, washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, removed of the Kapton tapes, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average.

As shown with black dotted lines 9 in FIG. 7A, Au of 200 nm in thickness was formed to overlap with the electrode pads through vapor deposition to form a first electrode and a second electrode on the carbon nanotube film in such a manner that an interval of 100 μm was provided between the electrodes, wherein, in contrast to Example 1, vapor deposition was carried out under conditions that allowed the metal Al to mix as an impurity in a proportion of 0.2% by mass (structure of electrodes: FIG. 5P).

Example 12

Carbon nanotube dispersion A was prepared in the same manner as in the process of Example 1. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 1 nm in thickness and Au of 100 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 6Q).

Example 13

Carbon nanotube dispersion A was prepared in the same manner as in the process of Example 1. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 5 nm in thickness and Au of 100 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 2% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 30 minutes. The substrate was washed with water and isopropyl alcohol, then dried, and heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 30 nm on average (structure of electrodes: FIG. 6R).

Example 14

Carbon nanotube dispersion A was prepared in the same manner as in the process of Example 1. An Si substrate which is the same as that in Example 1 was subjected to oxygen plasma treatment, and a photoresist was then applied to the substrate for electrode patterning in such a manner that an interval of 100 μm was provided between the electrodes. The electrodes, a first electrode and a second electrode, were formed both as Ti of 5 nm in thickness and Au of 100 nm in thickness through E-gun vapor deposition, and the resist was lifted off.

This substrate with electrodes was sequentially washed with acetone, isopropyl alcohol and water and subjected to oxygen plasma treatment to remove organic substances on a surface. The substrate was immersed in a 0.5% by volume APTES aqueous solution for 30 minutes and washed with water, and then dried.

Onto the APTES-coated substrate, approximately 100 μL of CNT dispersion A was dropped, the dispersion was spread over the whole surface of the substrate, and the substrate was left to stand for 2 hours, washed with water and isopropyl alcohol, and then dried. Again for the resulting substrate, the steps of dropping CNT dispersion A, leaving, washing, and drying were repeatedly performed 10 times. Thereafter, the substrate was heated at 180° C. in the atmosphere to remove the nonionic surfactant and others. SEM observation of the surface of the substrate found that carbon nanotubes were attached in a random network. The thickness of the carbon nanotube layer was estimated from the SEM observation to be approximately 110 nm on average (structure of electrodes: FIG. 6S).

Comparison Between Examples 1 to 14 and Comparative Example 1

Figure 8:
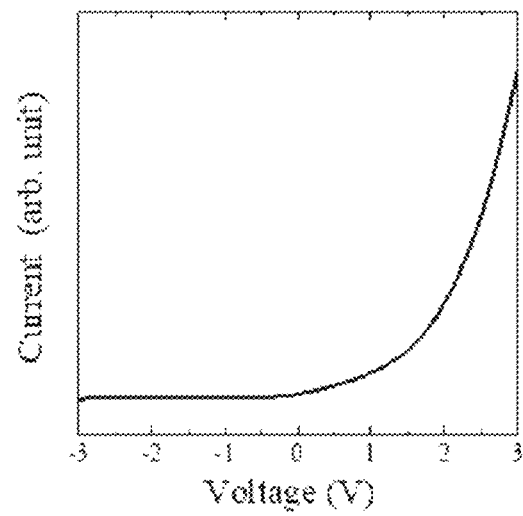
FIG. 8 is a graph showing IV characteristics for a comparative example in Examples.
Figure 9:
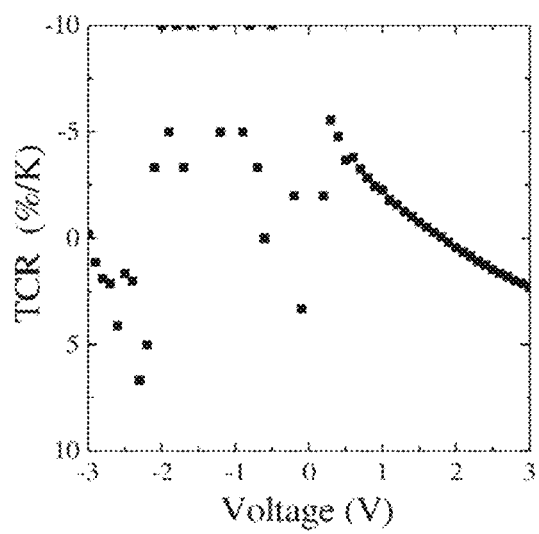
FIG. 9 is a graph showing TCR for a comparative example in Examples.

FIGS. 8 and 9 show the current-voltage characteristics of a bolometer produced from the electrodes and the carbon nanotube film in Comparative Example 1 and the voltage dependence of TCR thereof at 25° C., FIGS. 10 and 11 show those for Example 1, FIGS. 12 and 13 show those for Example 2, FIGS. 14 and 15 show those for Example 11, and FIGS. 16 and 17 show those for Example 13. Comparative Example 1 gave Schottky-type current-voltage characteristics (FIG. 8), and Examples 1 to 9 gave linear current-voltage characteristics (FIG. 10, FIG. 12). Examples 11 to 13 gave current-voltage characteristics such that Schottky-type current-voltage characteristics were slightly overlapping with linear current-voltage characteristics (FIG. 14, FIG. 16). Table 1 shows results of measurement of average TCR within a voltage range of −3 V to +3 V at 25° C. to 35° C. for Examples 1 to 14 and Comparative Example 1. Comparative Example 1, in which single-walled carbon nanotubes each being a p-type semiconductor were partially in contact with a metal having lower work function than the carbon nanotubes (Ti), gave Schottky-type current-voltage characteristics as a result of the partial contact, and low negative TCR or low positive TCR was exhibited as the voltage increased in the positive voltage region, and a large variation of TCR was found in a region from low positive voltages to negative voltages, with TCR as high as −5%/K or more exhibited only in a narrow voltage region. In contrast to this, Examples 1 to 6, in which carbon nanotubes were in contact only with a metal having higher work function than the carbon nanotubes (Au, Ni, Cu), adhering in an ohmic manner, gave linear current-voltage characteristics and high TCR was exhibited almost over the full voltage region of −3 V to +3 V because of the ohmic adhesion. Examples 7 to 10, in which carbon nanotubes were not in contact with lower-work-function Ti because of such a structure that Ti regions as lower regions of the electrodes were covered with CNTs having high surfactant concentration, insulating titanium dioxide particles, or metallic graphite (carbon has higher work function than the carbon nanotubes), or CNTs were separated from Ti regions, gave linear current-voltage characteristics similar to those for Examples 1 to 6, and high TCR was exhibited almost over the full voltage region of −3 V to +3 V. The configuration as in Example 11, in which carbon nanotubes were in contact with the electrodes in a state in which a metal having lower work function than the carbon nanotubes (Al) was mixing as an impurity, gave a current-voltage curve such that Schottky-type current-voltage characteristics were overlapping with linear current-voltage characteristics. That sample, in which the amount of the impurity was small, exhibited an ohmic component more than a Schottky component, and hence slightly low TCR was exhibited in the positive voltage region highly influenced by Schottky-type characteristics; nevertheless, high TCR was exhibited over a broad voltage region, and particularly high TCR was exhibited particularly in the negative voltage region and in a low-voltage region. Even in the case that an impurity is mixing, high TCR is likely to be achieved in a broad voltage region if the amount of the impurity is small as in Example 11. Moreover, the configuration as in Example 12, in which carbon nanotubes were in contact with a metal having lower work function than the carbon nanotubes (Ti) only at an impurity level, also gave a current-voltage curve such that Schottky-type current-voltage characteristics were overlapping with linear current-voltage characteristics, and high TCR was exhibited over a broad voltage region. Example 13, in which carbon nanotubes were in contact to a slight degree with a metal having lower work function than the carbon nanotubes (Ti) because Ti regions as lower regions of the electrodes were almost but not completely covered with APTES, also gave a current-voltage curve such that linear current-voltage characteristics and Schottky-type current-voltage characteristics were overlapping with each other, and particularly high TCR was exhibited particularly in a broad negative voltage region. The configuration as in Example 14, in which carbon nanotubes were in contact only at a low proportion with a metal having lower work function than the carbon nanotubes (Ti), also gave a current-voltage curve such that Schottky-type current-voltage characteristics were overlapping with linear current-voltage characteristics, and high TCR was exhibited over a broad voltage region. Thus, sensors being of high TCR in a broad voltage region and provided with high sensitivity were successfully produced as the bolometers with carbon nanotubes by bringing carbon nanotubes into contact exclusively or at a low proportion with a metal or alloy having higher work function than the carbon nanotubes.

TABLE 1

Results of measurement of average TCR within a voltage range of −3 V to +3 V

|  | Average of absolute value of TCR (%/K) |
|---|---|
| Comparative Example 1 | 2.1 |
| Example 1 | 5.5 |
| Example 2 | 5.0 |
| Example 3 | 4.9 |
| Example 4 | 5.3 |
| Example 5 | 5.1 |
| Example 6 | 5.5 |
| Example 7 | 4.8 |
| Example 8 | 4.9 |
| Example 9 | 4.7 |
| Example 10 | 4.1 |
| Example 11 | 7.1 |
| Example 12 | 5.5 |
| Example 13 | 6.4 |
| Example 14 | 6.9 |

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

EXPLANATION OF REFERENCE

1 Substrate
2 First electrode
3 Bolometer film
4 Second electrode
5 part formed by material to prevent contact between bolometer film and electrodes
6 electrode pad (detection electrode)
7 Kapton tape
8 APTES-coated part, CNT-coated part
9 first electrode and second electrode (contact electrodes)
10 channel part
A part of electrode connecting to part B
B part of electrode in contact with substrate
a metal having higher work function than carbon nanotubes
a' metal having higher work function than carbon nanotubes
b metal having lower work function than carbon nanotubes

The invention claimed is:

1. A bolometer comprising two electrodes provided on a substrate and a bolometer film lying between the two electrodes to connect the two electrodes, wherein
the bolometer film comprises p-type semiconducting carbon nanotubes, and
contact sites of the two electrodes with the bolometer film each consist only of a monometal or alloy having higher work function than the p-type semiconducting carbon nanotubes, or
the proportion of a monometal or alloy having lower work function than the p-type semiconducting carbon nanotubes in metals constituting the contact sites of the two electrodes with the bolometer film is 10% by mass or less, or the contact area of a monometal or alloy having lower work function than the p-type semiconducting carbon nanotubes with the bolometer film is 10% or less of the total contact area between the electrodes and the bolometer film.

2. A bolometer comprising two electrodes and a bolometer film lying between the two electrodes to connect the two electrodes, wherein
the bolometer film comprises n-type semiconducting carbon nanotubes, and
contact sites of the two electrodes with the bolometer film each consist only of a monometal or alloy having lower work function than the n-type semiconducting carbon nanotubes, or
the proportion of a monometal or alloy having higher work function than the n-type semiconducting carbon nanotubes in metals constituting the contact sites is 10% by mass or less, or the contact area of a monometal or alloy having higher work function than the n-type semiconducting carbon nanotubes with the bolometer film is 10% or less of the total contact area between the electrodes and the bolometer film.

3. The bolometer according to claim 1, wherein the monometal or alloy having higher work function than the p-type semiconducting carbon nanotubes comprises at least one selected from the group consisting of gold, platinum, copper, cobalt, nickel, carbon, and palladium.

4. The bolometer according to claim 2, wherein the monometal or alloy having lower work function than the n-type semiconducting carbon nanotubes comprises at least one selected from the group consisting of titanium, iron, aluminum, silver, tungsten, zinc, chromium, tin, lead, magnesium, manganese, yttrium, niobium, vanadium, zirconium, molybdenum, indium, lanthanum, tantalum, hafnium, bismuth, ruthenium, and rhodium.

5. The bolometer according to claim 1, having linear current-voltage characteristics.

6. The bolometer according to claim 1, wherein the bolometer film comprises semiconducting single-walled carbon nanotubes in a proportion of 90% by mass or more of carbon nanotubes in the bolometer film.

7. The bolometer according to claim 1, wherein the two electrodes are identical.

8. A method for producing a bolometer comprising two electrodes and a bolometer film lying between the two electrodes to connect the two electrodes, the method comprising:

forming two electrodes on a substrate; and producing a bolometer film comprising p-type semiconducting carbon nanotubes in such a manner that the bolometer film connects the two electrodes, wherein contact sites of the two electrodes with the bolometer film each consist only of a monometal or alloy having higher work function than the p-type semiconducting carbon nanotubes, or the proportion of a monometal or alloy having lower work function than the p-type semiconducting carbon nanotubes in metals constituting the contact sites of the two electrodes with the bolometer film is 10% by mass or less, or the contact area of a monometal or alloy having lower work function than the p-type semiconducting carbon nanotubes with the bolometer film is 10% or less of the total contact area between the electrodes and the bolometer film.

9. The method for producing a bolometer according to claim 8, the method comprising:

subjecting a dispersion comprising carbon nanotubes and a surfactant to carrier-free electrophoresis to prepare a carbon nanotube dispersion comprising semiconducting carbon nanotubes and a surfactant;

producing a bolometer film with the carbon nanotube dispersion comprising the semiconducting carbon nanotubes and the surfactant; and removing the surfactant from the bolometer film formed.

\* \* \* \* \*